United States Patent [19]
Binkley et al.

[11] Patent Number: 6,022,671
[45] Date of Patent: Feb. 8, 2000

[54] METHOD OF MAKING OPTICAL INTERCONNECTS WITH HYBRID CONSTRUCTION

[75] Inventors: Edward S. Binkley, Los Altos; James C. Nurse, San Jose, both of Calif.

[73] Assignee: Lightwave Microsystems Corporation, Santa Clara, Calif.

[21] Appl. No.: 08/814,400

[22] Filed: Mar. 11, 1997

[51] Int. Cl.[7] .................................................. G02B 6/136
[52] U.S. Cl. .......................................... 430/321; 430/320
[58] Field of Search ................................ 385/14, 15, 132, 385/130, 129; 216/24, 39; 430/321, 320

[56] References Cited

U.S. PATENT DOCUMENTS

| | | | |
|---|---|---|---|
| 3,580,656 | 5/1971 | Carson | 359/35 |
| 4,708,423 | 11/1987 | Erman et al. | 385/14 |
| 4,840,446 | 6/1989 | Nakamura et al. | 385/132 |
| 4,895,615 | 1/1990 | Muschke | 216/24 |
| 5,008,043 | 4/1991 | Robello et al. | 385/132 |
| 5,133,037 | 7/1992 | Yoon et al. | 358/132 |
| 5,157,756 | 10/1992 | Nishimoto | 385/129 |
| 5,206,925 | 4/1993 | Nakazawa et al. | 385/14 |
| 5,281,305 | 1/1994 | Lee et al. . | |
| 5,387,269 | 2/1995 | Nijander et al. | 385/132 |
| 5,395,556 | 3/1995 | Drost et al. | 252/582 |
| 5,465,310 | 11/1995 | Kersten et al. | 385/22 |
| 5,465,860 | 11/1995 | Fujimoto et al. . | |
| 5,514,799 | 5/1996 | Varanasi et al. | 544/300 |
| 5,581,642 | 12/1996 | Deacon et al. . | |
| 5,678,935 | 10/1997 | Sakata | 385/132 |
| 5,703,989 | 12/1997 | Khan et al. | 385/131 |

FOREIGN PATENT DOCUMENTS

| | | | |
|---|---|---|---|
| 0445527 | 9/1991 | European Pat. Off. | 385/14 |
| 62-119504 | 5/1987 | Japan | 385/132 |
| 63-44604 | 2/1988 | Japan | 385/129 |
| 1-248107 | 10/1989 | Japan | 385/131 |
| 3-296003 | 12/1991 | Japan | 385/14 |
| 6-214275 | 8/1994 | Japan . | |
| 2199157 | 6/1988 | United Kingdom | 385/129 |
| 90/09605 | 8/1990 | WIPO . | |

OTHER PUBLICATIONS

Ramey et al., "Polyurethane fan out . . ." IEEE TRans. vol. 12, pp. 1041–1048, Dec. 1979.
Mori, "Ridge wavguide . . . " Apll. Opt., vol. 17, No. 1, pp. 105–108, Jan. 1978.
Heidrich et al., "Electronics Variable . . . ", Vo.. 18, No. 9, pp. 3132–3133, Feb. 1976.
Anonymous, "Optical Signal Distribution by Filled–Trench Channel Polymer Waveguide" *IBM Technical Dislcosure Bulletin* 34(9):411–412 (Feb. 1992).
Hikita, M. et al., "Optical intensity modulation in a vertically stacked coupler incorporating electro–optic polymer" *Applied Physics Letters* 63(9):1161–1163 (1993).
Ruberto, M.N. et al., "Graded–Effective–Index Waveguiding Structures Fabricated with Laser Processing" *Digital Optical Computing II, SPIE* 1215:538–557 (1990).
Abstract of JP 09–022035.
Nishihara et al., *Optical Integrated Circuits* (1985) McGraw–Hill, pp. 29–32, 46–61 (Cover page and table of contents enclosed herewith).

(List continued on next page.)

*Primary Examiner*—Martin Angebranndt
*Attorney, Agent, or Firm*—Morrison & Foerster LLP

[57] ABSTRACT

Disclosed is a hybrid waveguide structure, wherein a core or cladding has a hybrid section or "button" of a different optical property such as refractive index from the major portion of the core or cladding, respectively. The hybrid section can be made of a passive material or an electro-optic material. Methods of making a hybrid waveguide structure are also disclosed. These methods include rib-based methods and trench-based methods, and in either of these methods, a temporary filler is used in many instances to incorporate the hybrid section into the hybrid waveguide structure.

62 Claims, 19 Drawing Sheets

OTHER PUBLICATIONS

Chen et al., "Facile approach to nonlinear optical side–chain aromatic polyimides with large second–order nonlinearity and thermal stability" *J. Am. Chem. Soc.* (1995) 117(27):7295–7296.

Cloonan, "Applications of free–space photonic technology for ATM switching" *IEEE lasers and electro–optics society meeting*, (1994) pp. 228–229.

Cloonan, "Promises and challenges for free–space digital optics in switching systems beyond the year 2000" *SPIE*, (Feb. 1995) 2440:2–7.

DeVoe et al., "Precision mesurements of the lifetime of a single trapped ion with a nonlinear electro–optic switch" *Optics Letters* (Nov. 1994) 19(22):1891–1893.

Erman et al., "Semiconductor digital optical switches and arrays" *OFC '94: Summaries of papers presented at the Conference on Optical Fiber Communication* (Feb. 1994) 4:53.

Nelson et al., "Large–angle 1.3–$\mu$m InP/InGaAsP digital optical switches with extinction ratios exceeding 20 dB" *OFC '94: Summaries of papers presented at the Conference on Optical Fiber Communication* (Feb. 1994) 4:53.

Falk et al., "Electro–optic imagery of high–voltage GaAs photoconductive switches" *IEEE transactions on electron devices* (Jan. 1995) 42(1):43–49.

Ferstl, "Fresnel zone lenses for an electro–optical 2×2–switch" *SPIE* (Feb. 1995) 2404:277–285.

Gao et al., "$Si_{1-x}GE_x$/Si asymmetric 2×2 electro–optical switch of total internal reflection type" *Appl. Phys. Lett.* (Dec. 1995) 67(23):3379–3380.

Lytel et al., "Large–scale integration of electro–optic polymer waveguides" *Polymers for lightwave and integrated optics*, Chapter 16, Marcel Dekker, Inc., (1992) pp. 433–472.

Ivanov et al., "Modeling of low–intensity electro–optical semiconductor switching device due to intrinsic photoconductivity" *J. Appl. Phys.* (Aug. 1994) 76(4):2522–2528.

Morrison et al., "Diode–pumped, Q–switched, 1.321$\mu$m Nd:YLF laser and its frequency doubling" *Optics Communications* (1995) 118:55–60.

Oh–e et al., "Electro–optical characteristics and switching behavior of the in–plane switching mode" *Appl. Phys. Lett.* (Dec. 1995) 67(26):3895–3897.

Shiqing et al., "Generation of 2~10 ns XeCl laser pulses by direct wave clipping with an electro–optical Q–switching" *Chinese J. Lasers* (Sep. 1995) A22(9):675–680 (English Abstract on p. 680).

Silberberg et al., "Digital optical switch" *Appl. Phys. Lett.* (Oct. 1987) 51(16):1230–1232.

Streifer et al, "Reformulation of the coupled–mode theory of multiwaveguide systems" *J. Lightwave Technology* (Jan. 1987) LT5(1):1–4.

Zayhowski et al., "Coupled–cavity electro–optically Q–switched Nd:YVO$_4$ microchip lasers" *Optics Letters* (Apr. 1995) 20(7):716–718.

Ultradel 4212

OPI1305 - x/y = 70/30
OPI2005 - y = 100%

Hitachi PIQ L100

METHOD OF MAKING OPTICAL INTERCONNECTS WITH HYBRID CONSTRUCTION

FIELD OF INVENTION

This invention relates to devices that have optical interconnects, such as digital electro-optic switches and multiplexers. More particularly, this invention utilizes a hybrid waveguide structure referred to herein as a "button" in an optical interconnect. New processes are also presented for fabricating circuits that incorporate these buttons.

BACKGROUND OF THE INVENTION

Optical devices such as optical waveguides and switches are used in communications and data transfer equipment to transfer information from one location to another and to switch the information to a desired output. The information is in the form of a continuous or a pulsing optical signal.

These optical devices contain a core or cores made of a material that transmits light of the desired wavelength and cladding that abuts at least one side of a core. Optical waveguides are used to carry optical signals from one location to another. Multiple cores are used to form e.g. switches to switch an optical signal to a desired output core, filters to filter one or more optical signals of a particular wavelength, or multiplexers to combine or separate optical signals of different wavelengths. Optical cores can be linear, but often optical cores must curve in order to direct a signal from one location to another within the confines of a small space.

One major objective of electro-optic device research is to reduce the size of components. There are two benefits from reducing the size of components: (1) devices such as waveguides and electro-optic switches are shorter and/or smaller, allowing more components to be placed within an integrated device; and (2) signals are transmitted between components more quickly, which increases the speed at which data is transferred.

Currently, if the direction of an optical signal is to be changed 90°, the core must be fabricated to have a radius of approximately 10 mm to avoid losing much of the optical signal to the cladding in the curved section. Consequently, every 90° turn that is incorporated along the length of a device adds at least 10 mm to the length or width of the device.

Another objective of electro-optic device research is to provide components that can be manufactured such that their switching characteristics are more consistent, so that a switch fabricated today performs essentially the same as a switch fabricated a month or year from today. Many switches have switching characteristics that are extremely sensitive to the voltage of the signal used to switch the optical signal from one output core to another or to distribute the optical signal among multiple cores. These switches are quite sensitive to manufacturing variances, and significant variations occur from one batch to the next of these switches or even within a batch of these switches.

An interferometric modulator as illustrated in FIG. 1 is a modulator whose performance is extremely sensitive to the voltage used to modulate the optical signal. This type of switch can be fabricated by diffusing a metal such as titanium into an electro-optic crystal such as $LiNbO_3$ to form the cores. The titanium-diffused portion of the crystal (which is also electro-optic) has a higher refractive index than the virgin portion of the crystal, and consequently, the titanium-diffused portion acts as cores which carry an optical signal.

The interferometric modulator 100 as illustrated in FIG. 1 uses multiple cores to modify an input optical signal. The input optical signal is split between two input cores 110 and 120, and the two input cores separate from one another a sufficient distance that the cores do not evanescently couple. The optical signal in core 110 travels through that core unmodified. The second core 120 has a set of electrodes 130 fabricated above it, so that an electric field can be applied to the electro-optic material in that core. The optical signal in the second core can be unmodified as it travels through the core, or the optical signal can have its phase shifted in response to the electric field created by electrodes above and on either side of the core. The two cores subsequently recombine to form one core, where the optical signals add to one another. If the optical signals from each core are in phase in the section where the cores recombine to form one core, the signals add to form an optical signal having the same wavelength and phase. If the optical signals are out of phase, the optical signal that is output depends on how much the phase of the signal was shifted as it traveled through core 120.

The interferometric modulator of FIG. 1 can be very difficult to fabricate consistently. The amount of titanium diffused into the crystal is highly dependent on processing conditions, and the minor variations in processing conditions that occur during normal manufacturing processes cause an interferometric modulator produced in one batch to function very differently from an interferometric modulator made in another batch of switches when an identical electric field is applied to both switches.

It is an object of this invention to provide hybrid waveguide structures such as optical waveguides that have improved properties such as greater isolation, tight turning radii, or different propagation characteristics. It is another object of this invention to provide hybrid waveguide structures such as electro-optic switches that have less variance in their intended use because of the switch design and/or because of the process by which the switches are manufactured.

SUMMARY OF THE INVENTION

The invention provides a hybrid waveguide structure comprised of at least one core and cladding. At least a portion of a core and/or a section of its surrounding cladding has optical properties that differ from the optical properties of a neighboring core or portion of the same core or cladding area, respectively. Thus, in a hybrid waveguide structure, a core may have a short section along the length of the core that has a refractive index which differs from the refractive index of other sections along the length of the core. Additionally or alternatively, the hybrid waveguide structure has a core in which its refractive index differs from the refractive index of another evanescently-coupled core, and/or the cladding near a core may have a section that has a refractive index which differs from the remaining cladding around the core. The hybrid portion of the hybrid waveguide structure is referred to as a "button" herein.

The invention also provides a hybrid electro-optic structure which has a portion of a core or a region of cladding made of an electro-optic material whose refractive index can differ from the refractive index of a neighboring portion of the same core or region of cladding, respectively. The refractive index of the electro-optic material can differ from the refractive index of its neighboring material in the presence of an applied electric field, or the refractive index of the electro-optic material can differ from the refractive index of its neighboring material in the absence of an applied electric field.

The invention also provides an integrated device having a hybrid waveguide structure and/or a hybrid electro-optic structure as described above.

In one embodiment, the invention provides a hybrid waveguide structure which in cross-section (as illustrated in FIG. 2) comprises three sections, a lower section 210, a middle section 220, and an upper section 230. Each section has a first, second, and third region when the structure has at least one core, and each section has a fourth and fifth region when the structure has at least two cores that are evanescently coupled. For a single-core structure, the regions are each formed of a material having a refractive index such that the second region of the middle section (222) is a core, and the first and third regions of the middle section are cladding under light-transmitting conditions. For a structure having two or more evanescently-coupled cores, the regions are each formed of a material having a refractive index sufficient that the second and fourth regions of the middle section (222 and 224, respectively) are cores and the first, third, and fifth regions (221, 223, and 225, respectively) are cladding under light transmitting conditions. The second and fourth middle regions are also spaced sufficiently closely that the second and fourth regions evanescently couple when light is transmitted into at least one of the second and fourth regions. The second middle region 222 is adjacent to the second lower region 212, the second upper region 232, and the first and third middle regions (221 and 223, respectively), and the fourth middle region 224 is adjacent to the fourth lower region 214, the fourth upper region 234, and the third and fifth middle regions (223 and 225, respectively). At least one of the regions is a hybrid region formed of a passive or electro-optic material such that at least one of the following conditions is satisfied:

1. in a cross-section taken at one point along the path of the optical signal, at least one of the second or fourth lower or upper regions or the first, second, third, fourth, or fifth middle regions has a hybrid portion, and in a cross-section taken at another point along the path of the optical signal, the same region has a non-hybrid portion;

in a cross-section taken at one point along the path of the optical signal for evanescently-coupled cores:

2. when the second or fourth lower region is the hybrid region, the other of the second or fourth lower region is formed of a cladding material having a refractive index that differs from the refractive index of the hybrid region;

3. when the second or fourth upper region is the hybrid region, the other of the second or fourth upper region is formed of a cladding material having a refractive index that differs from the refractive index of the hybrid region;

4. when the first, third, or fifth middle region is the hybrid region, at least one of the other of the first, third, or fifth middle region is formed of a cladding material having a refractive index that differs from the refractive index of the hybrid region; and 5. when the second or fourth middle region is the hybrid region, the other of the second or fourth middle region is formed of a core material having a refractive index that differs from the refractive index of the hybrid region.

Further, the invention provides new methods of making these structures. The methods place a material of different optical properties (e.g. a different refractive index) either (1) within a core in the structure or (2) within the cladding of the structure and sufficiently close to a core to affect the electric field of an optical signal being carried by the core. A rib-based method can be used to make a structure of this invention, wherein a rib of core material is formed as the structure is made, and either a portion of the rib or a portion of the cladding abutting the rib is a hybrid portion. One rib-based method is based on forming a cavity in a layer of a first core material, filling the cavity with a second core material, and removing a sufficient amount of the first core material to form a core having a length, a width, and a height such that the core has a portion along its length wherein the second core material spans the width and height of the core, and the second core material is located between two portions of the first core material of the core. Another rib-based method is based on forming a core comprised of a core material on a layer of a first cladding material and placing a second cladding material adjacent to at least one side of the core such that the second cladding material abuts that side of the core.

Another method for making a structure of this invention is a trench-based method, wherein a channel is formed and the channel is filled with core material as the structure is made, and either a portion of the core or a portion of the cladding abutting the core is a hybrid portion. One trench-based method is based on forming a channel in a layer of a cladding material, filling at least a portion of that channel with a first core material, forming a void in the first core material, and filling the void with a second core material. Another trench-based method is based on embedding a region of a first cladding material into a layer of a second cladding material, and forming a core within the layer of cladding such that both cladding materials abut the core on the same side of the core.

A temporary filler may be used in the processes described above. The temporary filler is placed in at least a portion of the structure (the core and/or the cladding) during manufacturing to allow portions of the structure to be fabricated of a material that differs from its surrounding material. The temporary filler is masked and partially etched, a first material is placed into the vacancies created by removing some of the temporary filler, and the remainder of the temporary filler is subsequently removed and replaced with a material that differs from the first material. This method can be used in the trench-based manufacturing process, wherein cores are formed in trenches cut into a substrate, or a rib-based manufacturing process, wherein rib cores are formed by etching a substrate and subsequently filling-in the etched portion with a cladding material. These methods produce regions of cores and/or cladding that have e.g. different refractive indices from surrounding materials.

Among other factors, the invention is based on the technical finding that a hybrid waveguide structure made by etching a substrate and using a temporary filler to provide cores or cladding with different refractive indices provides: (1) isolation between cores that can be varied; (2) a very small turning radius for cores; (3) very consistent performance between one batch of waveguides and/or switches and subsequent batches of waveguides and/or switches; (4) accurately-controlled dimensions and consistent performance because of the method of making the structure; (5) little overall loss of optical signal despite the use of materials in the structure that create high signal losses; (6) smaller devices or devices that have more components for a given size; and (7) unique device structures that act as filters, tapers, and switches that could not be made using a single material set. Further, the methods supplied by this invention align major structural elements such as hybrid cores to very accurate dimensions because these elements are established in a single photolithographic step. Also, the methods of this invention require few photolithography steps in which a substrate must be removed and repositioned within a stepper multiple times, so that cores and cladding can be made to precise dimensions. These technical findings and advantages and others are apparent from the discussion herein.

DESCRIPTION OF THE FIGURES

The Figures illustrate certain preferred embodiments of the invention, and, consequently, the claims are to be given their broadest interpretation that is consistent with the specification, the drawings, and the meaning of terms used herein to one of ordinary skill in the art.

DESCRIPTION OF THE PREFERRED EMBODIMENTS

The invention provides a hybrid waveguide structure and methods of making a hybrid waveguide structure. A hybrid waveguide structure comprises at least one core that carries an optical signal and cladding into which the electric field of the optical signal being carried by the core extends, wherein at least a portion of a core and/or a section of its cladding has optical properties (e.g. a refractive index) that differs from the optical properties of a neighboring core or portion of the same core or cladding area, respectively. Thus, in a hybrid waveguide structure, a core may have a section that has a refractive index that differs from the refractive index of the remainder of the core or that differs from the refractive index of another core, and/or the cladding near a core may have a section that has a refractive index which differs from the remaining cladding around the core. The description of some preferred embodiments of a hybrid waveguide structure follows. Although these preferred embodiments describe cores that are aligned within a single layer, this invention also encompasses structures in which optical cores are provided in multiple layers.

1. Waveguides and switches

As described previously, a hybrid waveguide structure can have a single channel core wherein a portion of the core or a portion of the cladding around the core has a refractive index that differs from the refractive index of other portions of the core or the cladding, respectively. Or, a hybrid waveguide structure can have multiple channel cores wherein at least a portion of one core or at least a section of the cladding has a refractive index that differs from the refractive index of another core or another section of cladding, respectively. Examples of each of these structures follow.

(a) Hybrid single-core structure

In one preferred embodiment of the invention, the hybrid waveguide structure has a "button" wherein a short section of the core or its surrounding cladding has a refractive index that differs from the refractive index of a neighboring portion of the same core or cladding area, respectively. A "button" is very useful in devices where the device designer wishes to modify characteristics of the optical signal locally to provide the device with unique properties.

Figure 1:
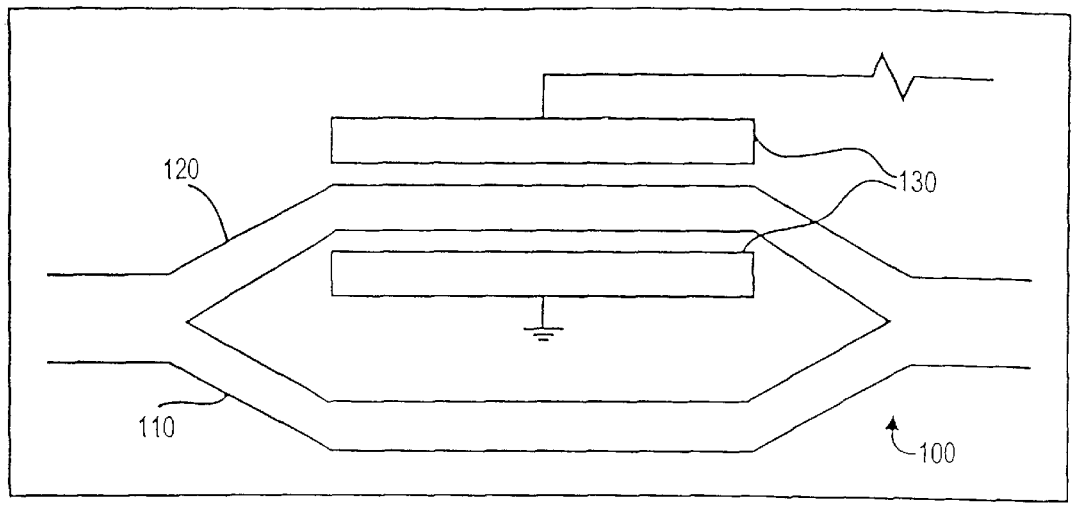
FIG. 1 illustrates a known interferometric switch.
Figure 3:
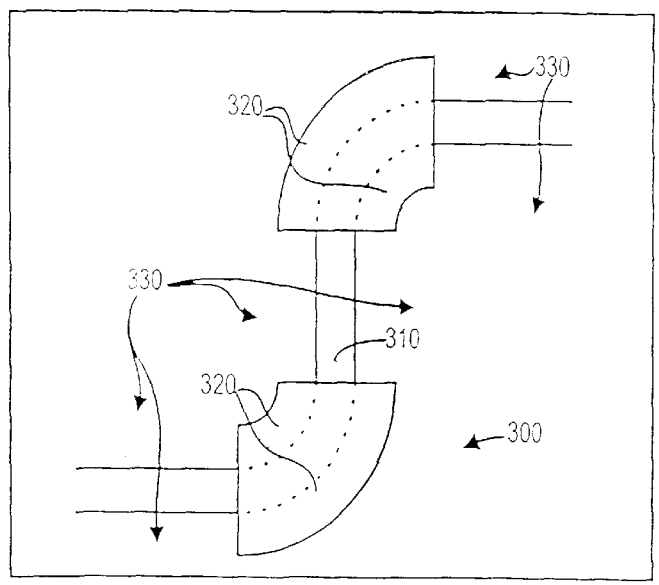
FIG. 3 illustrates a waveguide having cladding buttons made by the method of this invention.

One example of a hybrid waveguide structure having a "button" is shown in FIG. 3. A single channel core 310 interconnects switches or other signal processing features that are fabricated on a substrate. The core makes two 90° turns that the optical signal must follow.

Prior structures used the same cladding material to surround the straight portion and the curved portion of the core. In these devices, each 90° turn required a turning radius of at least 10 mm where the cladding had a refractive index of 1.519 and the core had a refractive index of 1.520 in order not to lose optical power out of the core into the cladding. Two 90° turns add 20 mm of length into the overall length of this prior structure.

The hybrid waveguide structure illustrated in FIG. 3 has cladding 320 surrounding the curved portion of the core which has a much lower refractive index than the cladding 330 surrounding the straight portions of the core. This "cladding button" in the core reduces the radius in the core from 10 mm in the prior device to only 1 mm where the core has a refractive index of 1.600, the curved section of cladding 320 has a refractive index of 1.500, and the remainder of the cladding has a refractive index of 1.590. The hybrid waveguide structure illustrated in FIG. 3 is thus 18 mm shorter than the prior structure and has essentially equivalent performance to the prior structure. This shorter length is a distinct advantage regardless of whether a waveguide structure or switch of this invention is used in a hybrid component device, wherein a waveguide or switch is connected to other discrete components, or in an integrated device wherein many components are placed on one substrate.

(b) Hybrid multi-core structure

The hybrid multi-core structure has at least two cores and surrounding cladding. A hybrid multi-core structure can have a "button," or a hybrid multi-core structure can have a core that has a different refractive index from another core or a region of cladding which is adjacent to a core and which has a different refractive index from another region of cladding adjacent to the core.

Figure 4:
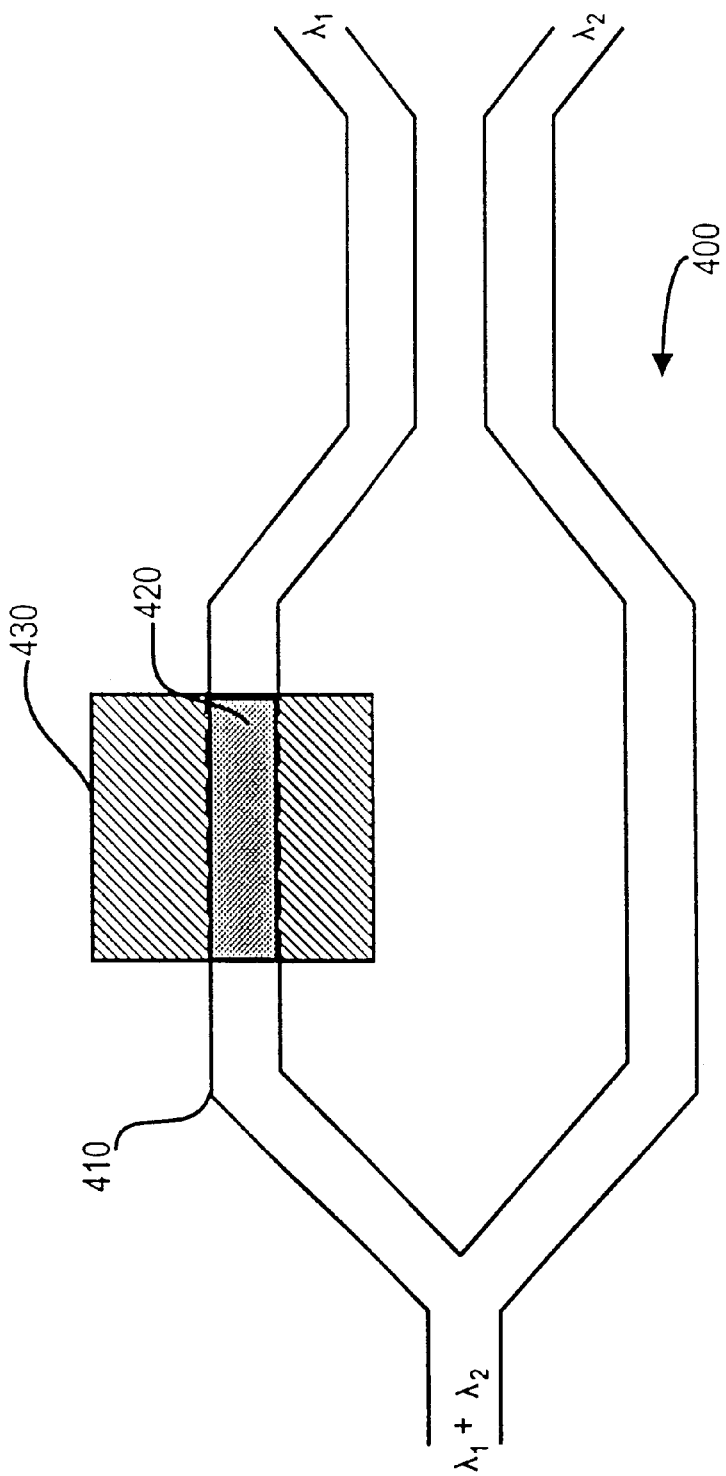
FIG. 4 shows an interferometric demodulator having both a core button and a cladding button.

A "button" can be used in an interferometric device such as a hybrid wave multiplexer or filter. FIG. 4 shows an interferometric multiplexer 400 wherein one of the cores 410 has a "core button" 420 in which a section of the core has a refractive index that differs from adjoining portions of the same core. FIG. 4 also shows a "cladding button" 430 in which a section of the cladding has a refractive index that differs from adjoining portions of the cladding. The use of a "button" delays the optical signal in that core relative to the optical signal in the second core, which results in a suitably modified optical signal emerging from the multiplexer after the signals from the two cores are coupled together and outputted from output sections of the cores. In this particular device, the difference between the refractive indices of the core and cladding buttons is at least approximately equal to the difference between the refractive indices of the core and cladding that neighbor the core and cladding buttons, respectively.

(c) Further discussion of hybrid waveguide structure

Figure 2:
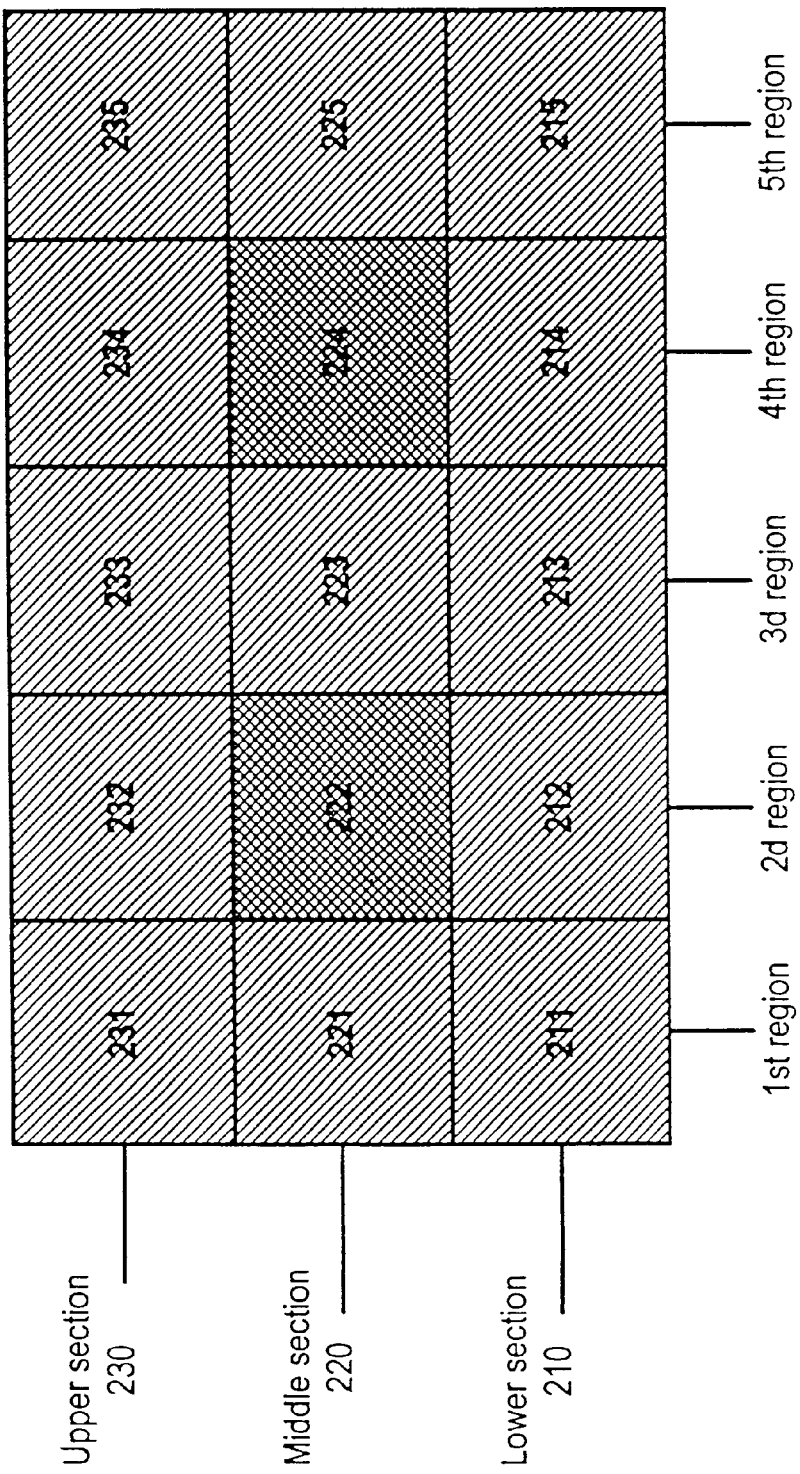
FIG. 2 illustrates a hybrid waveguide structure having three sections, a lower section, a middle section, and an upper section, and wherein each section has a first, second, third, fourth, and fifth region.

In certain embodiments, a hybrid waveguide structure of this invention has a core or cores that are sandwiched between optional electric-field-generating electrodes. The hybrid waveguide structure can be viewed as having three sections, as illustrated in FIG. 2: a middle section 220 containing at least one core 222 (or containing at least two cores 222 and 224) in core regions and cladding 221 and 223 (and 225 when the structure has at least two cores) in cladding regions adjacent to the cores; a lower section 210 that typically contains cladding in regions that affect the optical signal in the cores; and an upper section 230 that also typically contains cladding in regions that affect the optical signal in the cores (usually a position immediately adjacent to the cores). At least one of the materials used in the core or cladding regions has optical properties (e.g. a refractive index) that differ from the optical properties of another material used in the core or cladding regions, respectively.

Thus, for example, one portion of a core in a structure having only one core may be formed from a passive material having a refractive index of 1.520, and another portion of that core may be formed from a passive or active material that has a refractive index of 1.510 in e.g. the presence of an electric field. Likewise, for example a cladding region in the upper section, e.g. 232, that affects the optical signal in the core can be formed from a first electro-optic material that experiences a change in refractive index of e.g. 0.010, and another region in the lower section that affects the optical signal in the core (e.g. 212) can be formed from a passive material or a second electro-optic material that experiences a change in refractive index of e.g. 0.005 when an electric field is applied to the structure.

Other examples include the following structures having two cores. In a first example, region 222 can be made of a passive core material having a refractive index of 1.520, and region 224 can be made of a passive or electro-optic core material having a refractive index of 1.510 in e.g. the absence of an electric field. Likewise, in a second example, regions 222 and 224 can be made of a passive core material having a refractive index of 1.520, and at least one of regions 212, 214, 221, 223, 225, 232, and 234 is a passive or electro-optic cladding material that has a refractive index that differs (in either the presence or the absence of an electric field) from one of the cladding regions in the structure. In a third example, sections 210 and 230 are made of a passive cladding material having a refractive index of 1.560, regions 222 and 224 are made of a passive core material having a refractive index of 1.60, and regions 221, 223, and 225 are made of a passive cladding material having a refractive index of 1.590. In a fourth example, a device has regions as in the third example above, but region 223 is an electro-optic cladding material that has a refractive index equal to that of regions 221 and 225 in the absence of an electric field.

The optical signal introduced into one end of a core has an electric field portion of the optical signal that extends into the surrounding cladding and into a coupled core, if present. In a hybrid waveguide structure, the optical signal encounters a region in the core and/or in the cladding wherein the refractive index of that region changes. The change in refractive index affects the electric field of the optical signal and thus changes the optical signal itself. The length, width, height, and refractive index of the hybrid portion and the length, width, height, and refractive index of the remaining core and cladding are selected to provide the desired modifications (such as phase shift or distribution of power of the optical signal in evanescently-coupled waveguides) to the optical signal. If the core that is initially carrying the optical signal is evanescently coupled to other cores, all optical signals in the cores are simultaneously changed by the change in refractive index, and the power exiting each core can be distributed as desired by selecting the length of the cores and regions, their width and height, the width and height of cladding regions, and the refractive index of each region. If an electro-optic material is used in the hybrid region, a change in electric field can be used to distribute a desired amount of the optical signal from the input core to any or each of the output cores or to induce a phase shift in an optical signal traveling through a single core.

The preferred refractive index of the hybrid portion depends upon the function of the hybrid portion in the particular optical device to be fabricated. Cladding buttons 320 in the waveguide of FIG. 3 preferably have a refractive index which differs substantially from the refractive index of its surrounding cladding (at least 0.01 units difference to as much as 0.05–0.1 units or more) in order to assure the needed directional change in the optical signal without introducing undesired modes of substantial strength into the optical signal. Passive core and cladding buttons (420 and 430, respectively) of the interferometric demodulator of FIG. 4 preferably each have a refractive index which differs substantially from the refractive index of the surrounding core and cladding, respectively (at least 0.01 units difference to as much as 0.05–0.1 units or more), while preferably the difference between the refractive index of the core and cladding buttons is equal to the difference between the refractive index of the surrounding core and surrounding cladding to prevent introducing additional modes of substantial strength into the optical signal. For coupled waveguides such as those illustrated in FIG. 2, the refractive index of the hybrid portion is approximately equal to its neighboring materials (in many instances, no more than about ±0.001 units different from its corresponding non-hybrid material). The change in refractive index that an electro-optic material experiences is selected depending on the desired change in optical signal and the dimensions of the optical device in which the electro-optic material is incorporated, and a typical change in refractive index for coupled waveguides is 0.010 units. Using a core or cladding material in the hybrid portion, which material has properties that are similar to its surrounding materials, can provide the ability to change the electric field of the optical signal a controlled amount and thus can affect the properties of the signal without substantial loss of signal energy or addition of modes or harmonics to the optical signal.

The materials from which the core, cladding, and hybrid portions of the hybrid waveguide structure are formed may be passive materials that do not change refractive index appreciably in the presence of an applied electric field; or, a hybrid portion, a core, or cladding may be e.g. an electro-optic material individually or in any combination. For example, in an "active" or "electro-optic core button," a cladding made of a passive material contains a hybrid core with a short section of electro-optic material which adjoins the passive material forming the remainder of the core. Also by way of example, in an "active cladding button," a core made of a passive material is embedded in a cladding made mostly of passive material but which contains a short cladding section of electro-optic material that is adjacent to the core. An electric field is applied to these electro-optic "buttons" to change the refractive index of the electro-optic material incorporated in the "buttons." Planar, strip, or circular electrodes, for example, can be positioned above the "button," or an electrode can be positioned above the "button" and one can be positioned below it. It is not necessary to generate the electric field to which the electro-optic material is exposed with electrodes. Any electric field-generating equipment can be used that generates an electric field sufficiently strong to change the refractive index in an electro-optic material present in the structure. For example, wires carrying a large current can be positioned above and/or below the electro-optic material. Likewise, a corona field or an electrostatic discharge from e.g. charged particles can be used to generate the electric field. Other materials that change refractive index in response to a signal may be used in place of or in addition to an electro-optic material. Such materials include thermooptic, elastooptic, magnetooptic, and acoustooptic materials.

Figure 5A:
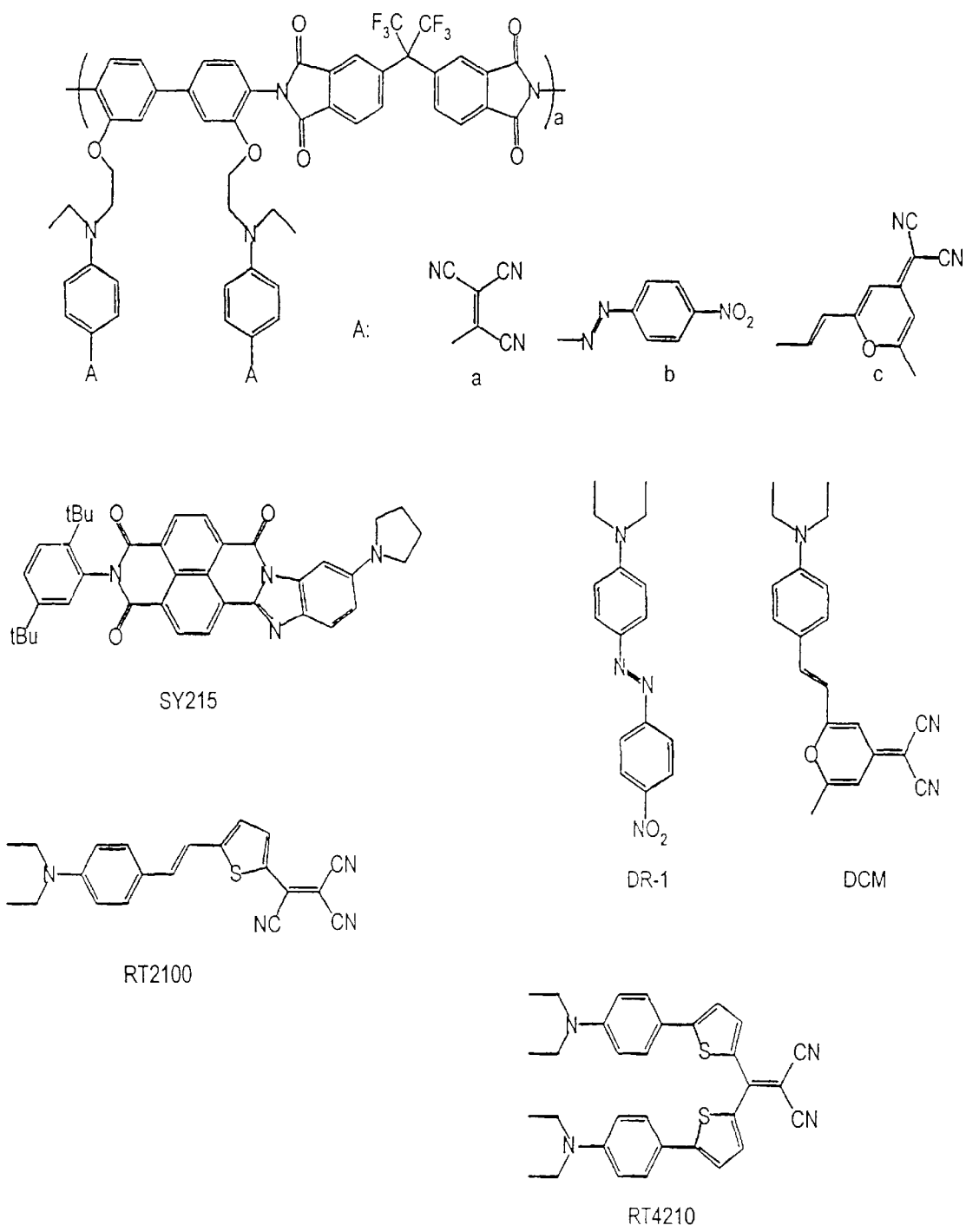
FIGS. 5A and 5B illustrate the structure of various electro-optic materials that can be used to make the structure of this invention.
Figure 5B:
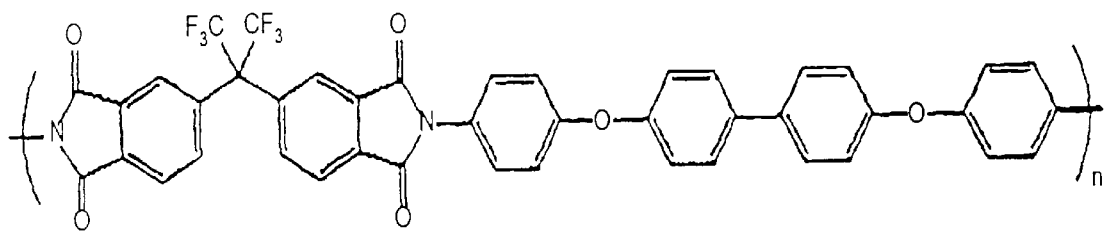
Figure 5B:
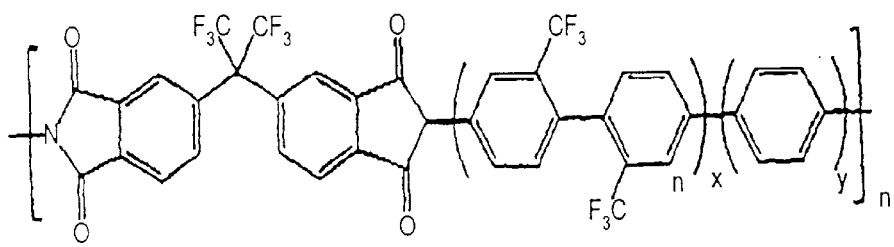
Figure 5B:
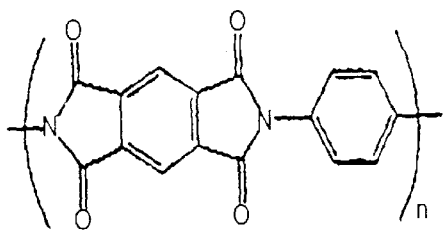

There are many examples of optical materials from which a hybrid waveguide structure can be fabricated. A difference in refractive index can be achieved by using different materials in the cores and/or the cladding or by applying an electric field to an electro-optic polymer. Electro-optic polymer materials are preferred electro-optic materials. Chromophores such as DR-1, DCM, RT2108, RT4210, or SY215 may be grafted onto passive materials such as Amoco Chemical Corporation's Ultradel 4212 or Hitachi Chemical Corporation's PIQ L100, OPI 1305, or OPI 2005 to form an electro-optic material (see FIGS. 5A and 5B for the structures of these materials, where "A" on the polymer structure may be any of the substituents shown in "a," "b," or "c"). Other electro-optic polymers include Enichem's polymers disclosed in U.S. Pat. Nos. 5,395,556 and 5,514,799, each of which is incorporated by reference herein. A hybrid digital electro-optic switch made with an electro-optic polymer can be manufactured easily and at low cost. Electro-optic materials can also be large bandgap crystals (such as $LiNbO_3$ or $KNbO_3$) or semiconductors (such as GaAs, InGaAs and other Group III–V compounds) that have been doped with a metal such as titanium to form cores and cladding regions. A hybrid digital electro-optic switch can also be fabricated into a multiple-quantum-well device by e.g. chemical vapor deposition to become a very low switching voltage device. Passive materials have little or no electro-optic effect, and typical examples of passive materials include Amoco's Ultradel 4212 and Hitachi's PIQ L100, OPI 1305, and OPI 2005. Cladding materials can be electro-optic or passive materials such as polyimide, polyacrylate (such as polymethylmethacrylate), benzyl-cyclobutene, or polyquinoline. The materials used to produce cores and/or cladding can be selected from a wide range of materials, including organic materials, inorganic materials and hybrid organic/inorganic materials, such as sol-gel glasses in a polymeric matrix. The electro-optic material in a core or cladding preferably has a refractive index equal to the refractive index of its neighboring core or cladding, respectively, either in the presence or absence of an applied electric field.

Core and cladding materials are preferably polymeric materials. These materials are easily handled in the method of this invention described below. Also, the refractive index of a batch of these materials can be determined before fabricating a structure, and the dimensions of each core and cladding can be determined and adjusted to provide consistent performance of a structure despite variations in material properties.

Electro-optic and passive "buttons" can be located at points of close approach or contact and/or between two or more adjacent optical cores to provide variable or fixed coupling between these cores, respectively. Control signal paths are routed to make electrical contact with electrodes above and below electro-optic buttons to enable control over the optical states of these buttons. An "off state" of an electro-optic core button can be selected such that the refractive index of the electro-optic material is essentially equal to that of the passive material of the optical core within which it is located so that the optical signal is outputted from the same core into which it is inputted. In an "on-state" of an electro-optic button, the refractive index of the electro-optic material of the core button is reduced so that at least a portion of the optical signal is outputted from the other core.

Hybrid waveguide structures can be designed using Maxwell's equations, Marcatili's method, or the effective index method, for example, as described in H. Nishihara et al., OPTICAL INTEGRATED CIRCUITS, pp. 29–32 and 46–61 (1985) (McGraw-Hill). For a hybrid waveguide structure containing two or more evanescently-coupled cores, usually the coupling length of the cores is selected during design, and the other design parameters such as material refractive index and width, height, and separation of cores are chosen to provide the desired switching characteristics for the particular application in which the hybrid waveguide structure is to be used. The hybrid section of a hybrid waveguide structure containing one core is usually designed to induce the desired phase-shift in the optical signal or to provide the desired value for the maximum angle of reflection of the optical signal at bends. The maximum thickness of the hybrid waveguide structure is usually established by the voltage that is available to produce the electric fields that act on the electro-optic material in the core. Where the hybrid waveguide structure has hybrid cladding, the hybrid section is sufficiently large and sufficiently close to the core to cause a desired amount of change in the electric field of the optical signal traveling through the core.

One advantage of many of the hybrid waveguide structures of this invention is that the structure can carry a single-mode optical signal without adding optical modes. Thus, a single-mode optical signal is also outputted from the structure.

The U.S. patent application, "Hybrid Digital Electro-optic Switch," inventors John T. Kenney and Richard D. Sherman, was filed on even date herewith and describes other and additional aspects of this invention. The disclosure of Mr. Kenney's and Mr. Sherman's patent application is incorporated by reference herein in its entirety for all that the application teaches.

Hybrid waveguide structures can be incorporated into equipment used for such purposes as:

(I) signal equalization in regenerative amplifiers for telecommunications;

(II) logic elements in an all optical or hybridized optical logic circuit;

(III) wavelength conversion elements in wavelength division multiplexing and demultiplexing switching systems for telecommunications;

(IV) external modulation of optical signals for digital signal transmission; and (V) an n-by-n crossbar switch used in telecommunications.

2. Method of making the hybrid waveguide structure

The invention provides methods of making a hybrid waveguide structure. The invention provides a "trench-based manufacturing process," in which relatively shallow trenches are cut into a material and filled with either a core or a cladding material. The invention also provides a "rib-based manufacturing process," in which cores are formed in ribs by cutting into a multi-layer material (at least one layer or portion of which is usually core material) and filling the deep troughs with cladding material. Many of these methods utilize a temporary filler that allows two optical materials to be placed in the trench or trough in very specific and well-controlled locations. One of the advantages of methods described below is that the cores within a layer are "self-aligned." The trenches or ribs in which the cores are formed are patterned in one photolithography step. Thus, even though portions of cores may be made of different materials, the trenches or ribs align to one another without the need to etch additional trenches and attempt to align the new trenches with previously-etched trenches.

Many electro-optic materials absorb substantial energy from the optical signal and can only be used in existing core structures in very limited circumstances. The process of this invention allows these "lossy" materials to be used in cladding buttons or in core buttons in the specific coupling, switching, or modulating region with little loss of the optical signal.

(a) Trench-based manufacturing process

In the trench-based manufacturing process, an optional electrode is formed on the surface of a substrate that is subsequently coated with e.g. a layer of a high-clarity, passive material that will function as the cladding for optical cores that are to be formed. A photolithographic process and associated etch (wet or dry) produces an open trench or a plurality of open trenches (e.g. two or more) in this passive material. At least one of these trenches is filled with a temporary, easily-etched filler material. This temporary filler is subsequently masked and etched to remove selected portions of the filler material. Portions within a trench may be removed to leave one or more short sections (referred to herein as "space-filler buttons") of temporary filler in one or more of the trenches, or, all of the temporary material in selected trenches may be removed so that some empty trenches and some trenches partly or wholly filled with temporary filler are provided.

The empty sections of each trench are filled with a second high-clarity material having a different property from the first material, and the structure is subsequently planarized by etching the structure or by using e.g. chemical-mechanical polishing (CMP). A second photolithography step may be performed so that a portion of the remaining temporary material can be etched and the resulting space filled with a third high-clarity material and so forth until all temporary material has been removed and filled with high-clarity material that has been planarized. Usually a layer of passive material is spun onto the structure, and subsequently an electrode or electrodes are formed above and near any electro-optic material incorporated into the structure.

Some specific examples of this process illustrate some of the benefits that are derived from using the trench-based manufacturing process to make hybrid waveguide structures.

(i) Core button made by trench-based manufacturing

Figure 6A:
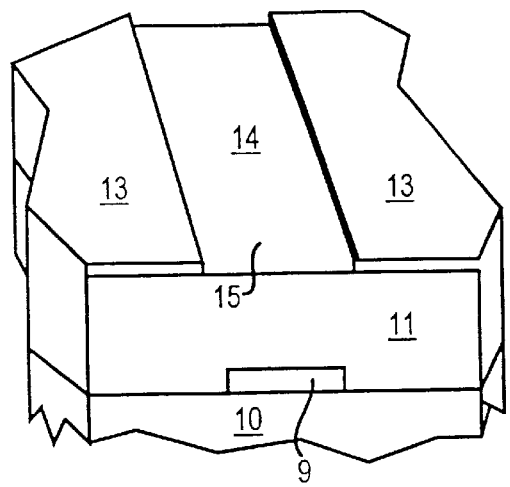
FIGS. 6A–6J illustrate a trench-based manufacturing method for manufacturing an optical waveguide or switch that has a core button.
Figure 6B:
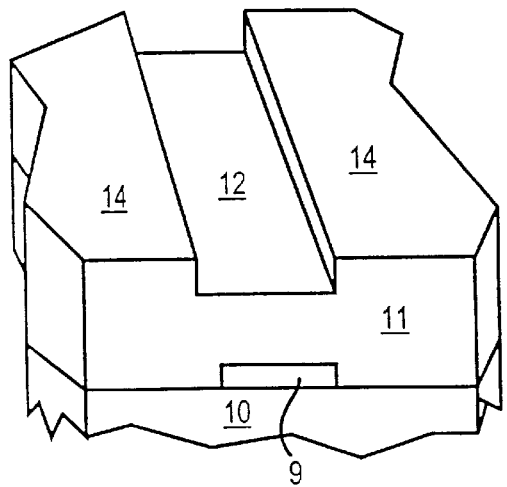

FIG. 6A illustrates a top portion of a wafer 10 on which a first cladding layer 11, such as polyimide, has been spun coated and an electrode, 9, has been formed. Trenches 12 (illustrated in FIG. 6B) are formed in cladding layer 11 by applying a masking layer 13 (photoresist or metal) to a top surface 14 of the first cladding layer and then patterning this masking layer, developing the exposed layer to produce a contact mask having an elongated rectangular opening 15 in the masking layer, and then etching the exposed portion of layer 11 in a wet or a dry etch to form trenches 12.

Figure 6C:
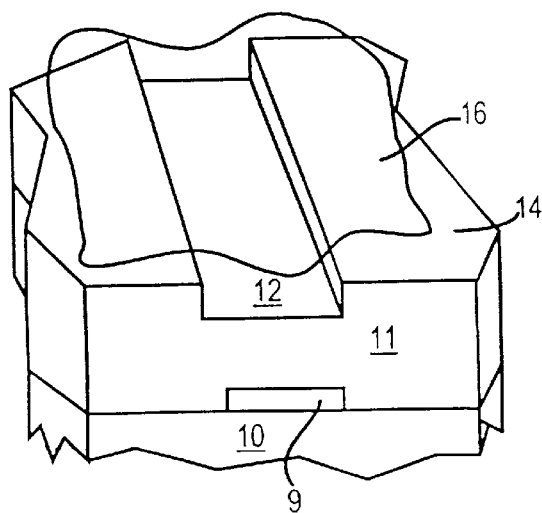
Figure 6D:
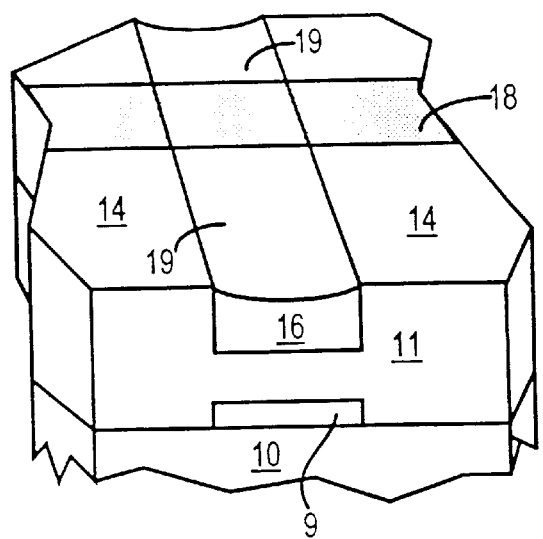
Figure 6E:
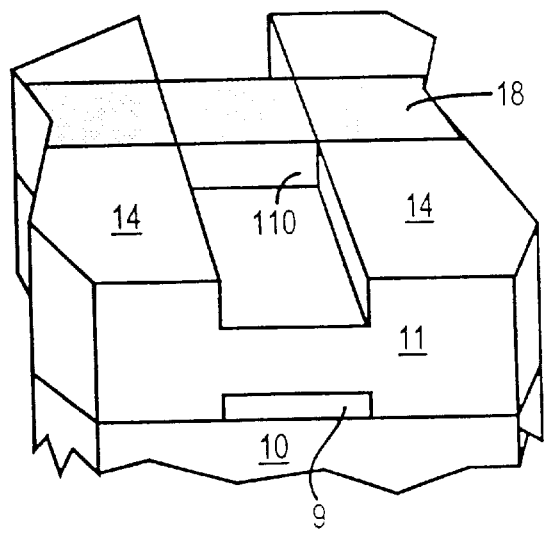

As illustrated in FIG. 6C, a layer of temporary filler 16 is e.g. sputtered or deposited via CVD onto cladding layer 11 to fill trenches 12. Next, as illustrated in FIG. 6D, a photolithographic mask 18, consisting of a conventional photolithographic material, is formed on top of surface 16 by conventional techniques. The top surface of this structure can be planarized at this point, if desired. Temporary filler 16 is patterned via photolithography, and the exposed portions 19 of temporary filler 16 is subsequently etched to form a temporary button 110 of FIG. 6E. A metal such as aluminum is a particularly good choice for the temporary filler, because the metal can be easily etched by a wet etch process that uses an acid bath such as a phosphoric/nitric acid bath without harming the polymer and substrate.

Figure 6F:
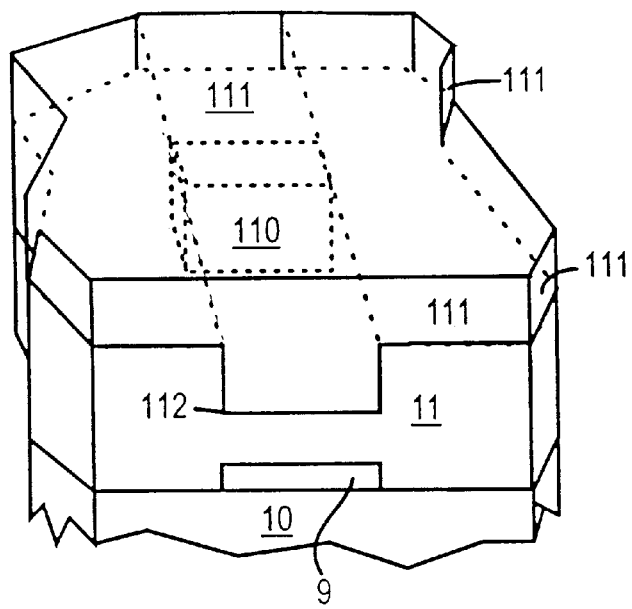
Figure 6G:
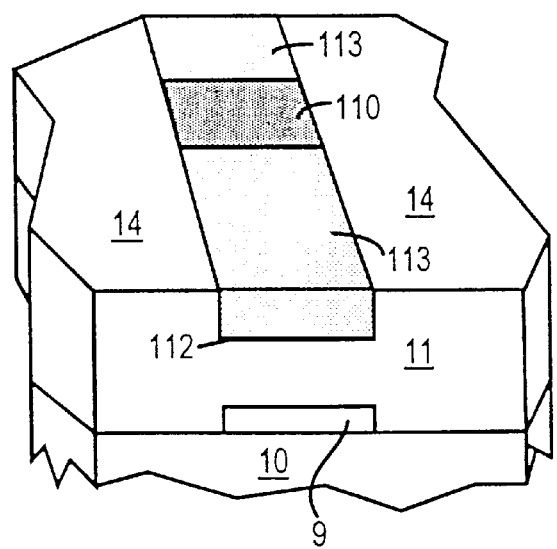

As illustrated in FIG. 6F, a layer of core material 111 is deposited to a thickness sufficient to fill in a set of trench openings 112 (illustrated in FIG. 6E) with core material to form core segments 113 illustrated in FIG. 6G. The top surfaces of the core material is planarized to produce top surfaces (illustrated in FIG. 6G) that are, in this case, coplanar with a top surface 14 of the first cladding layer. This planarization also exposes the temporary filler buttons 110. This figure illustrates core segments 113 and one of the temporary filler buttons 110.

Figure 6H:
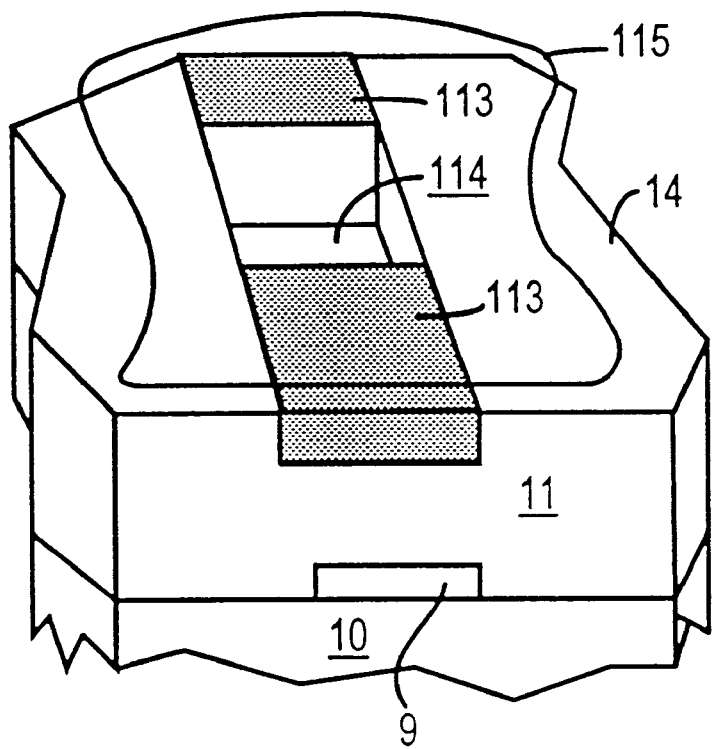
Figure 6I:
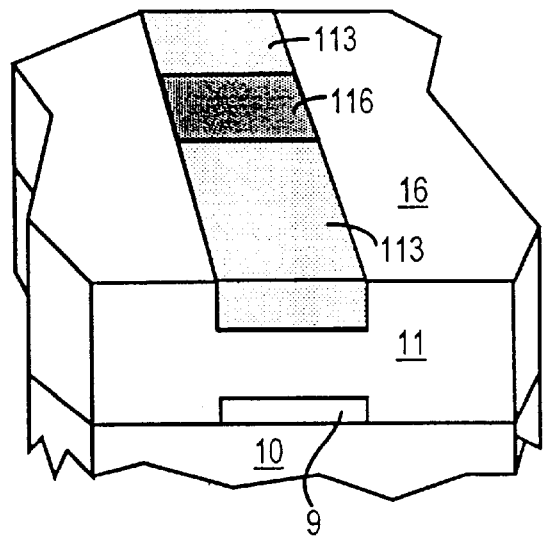

The temporary filler buttons 110 are removed (e.g., by etching with a suitable etchant) to produce button openings 114 shown in FIG. 6H. As illustrated in that figure, a layer of optical material 115 is applied to fill in the button openings 114, thereby producing the buttons 116, illustrated in FIG. 6I. Thus buttons 116 can be formed of passive material having a refractive index that essentially does not change in response to an applied electric field, or buttons 116 can be an electro-optic material that changes refractive index in the presence of an applied electric field. For example, it may be advantageous to use a passive button to produce a fixed amount of coupling between a pair of closely-spaced optical cores. Alternatively, a passive button can be used merely to introduce a fixed delay in an optical signal path.

Figure 6J:
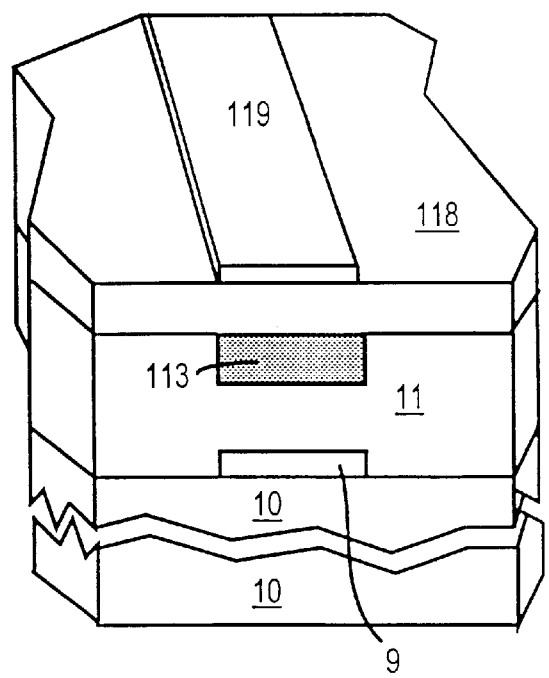

A second cladding layer 118 (illustrated in FIG. 6J) of the same cladding material used to form first cladding layer 11 is applied, and electrode 119 is formed above at least core button 116. A backplane electrode 9 is included so that an electric field can be generated to change the refractive index of the electro-optic material.

(ii) Cladding button made by trench-based manufacturing

Figure 7A:
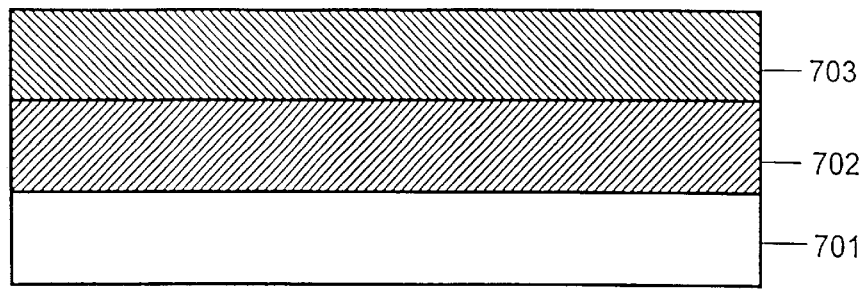
FIGS. 7A–7F illustrate a trench-based manufacturing method for manufacturing an optical waveguide or switch that has a cladding button.
Figure 7B:
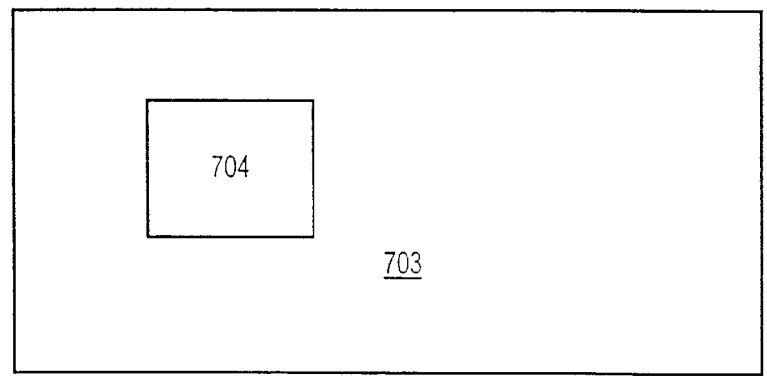
Figure 7C:
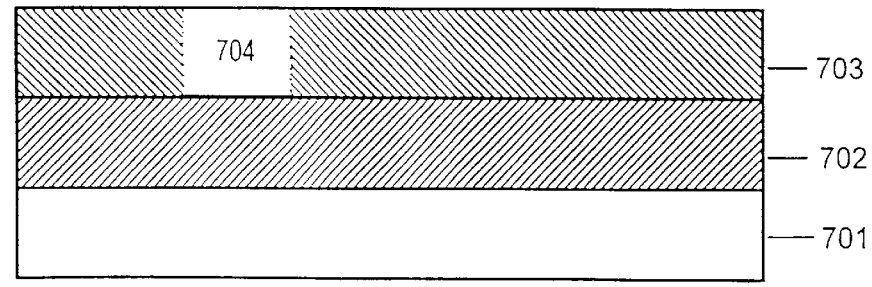
Figure 7D:
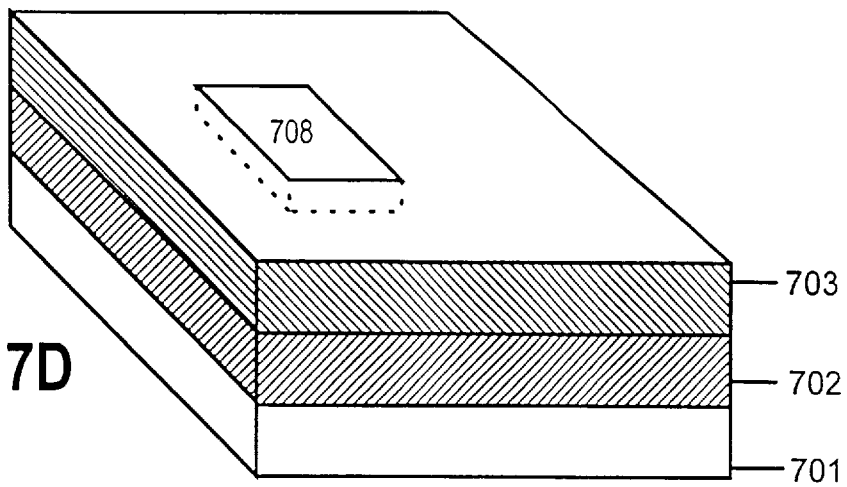

In this trench-based manufacturing method, a substrate 701 shown in side view in FIG. 7A is coated with a first layer of a cladding material 702. A second layer of a second cladding material 703, having a refractive index greater than the refractive index of the first cladding material, is deposited on the first cladding layer in this example, patterned via photolithography, and etched to produce cavities 704 illustrated in the top view of FIG. 7B (this second layer is optional and may be eliminated). These cavities are located in areas through which a core or cores of the structure will run after processing is completed. The cavities are etched through the second cladding material of the second layer and to the surface of the first layer as illustrated in the side view of FIG. 7C. Etch depth is controlled by timing the etch or by using a laser interferometer.

Figure 7E:
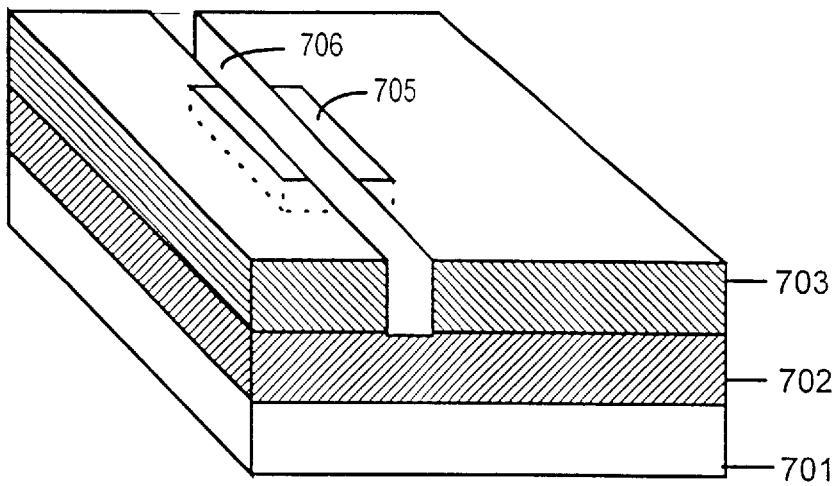
Figure 7F:
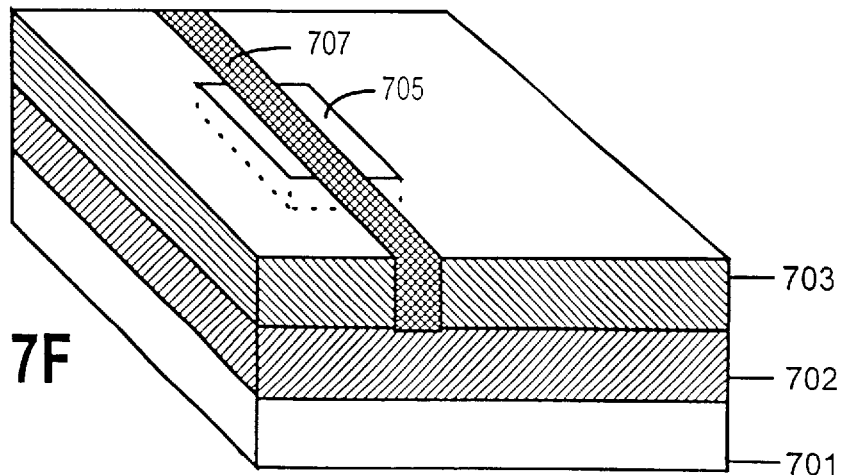

The cavities are filled with a third cladding material 705 and planarized via, e.g., dry etching. The structure is again patterned via photolithography and etched to the first cladding layer to define channel 706 of FIG. 7E. The channels so formed are filled with a core material and planarized to form core 707 and the structure shown in FIG. 7F. Subsequently, the structure is coated with a fourth cladding material which e.g. is the same cladding material used to form the first layer. Electrodes may be added to the structure where the material used to form the cladding buttons is an electro-optic material. Preferably, the third cladding material that is used to fill the core wells is electro-optic material. A temporary filler is not needed in this method.

(b) Rib-based manufacturing process

A "rib-based manufacturing process" can also be used to manufacture hybrid waveguide structures having e.g. core or cladding buttons. Generally, in a rib-based manufacturing process, cores are contained within ribs that are fabricated of optically-transmissive materials, and cladding material is placed between the ribs. A temporary filler is used in methods of this invention so that materials having different refractive indices (or having differences in other useful properties) can be placed in portions of the structure being fabricated.

(i) Core button made by rib-based manufacturing

Figure 8A:
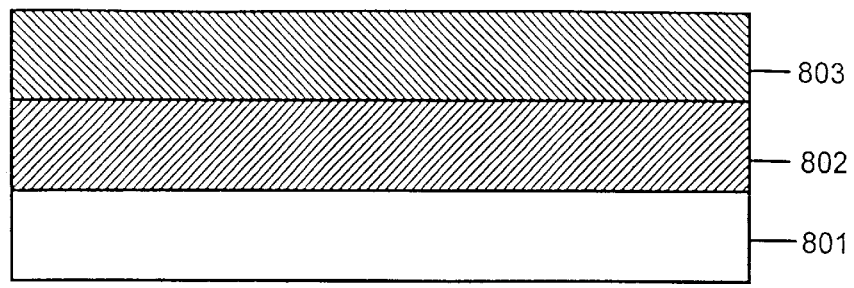
FIGS. 8A–8F show a rib-based manufacturing method for manufacturing an optical waveguide or switch that has a core button.
Figure 8B:
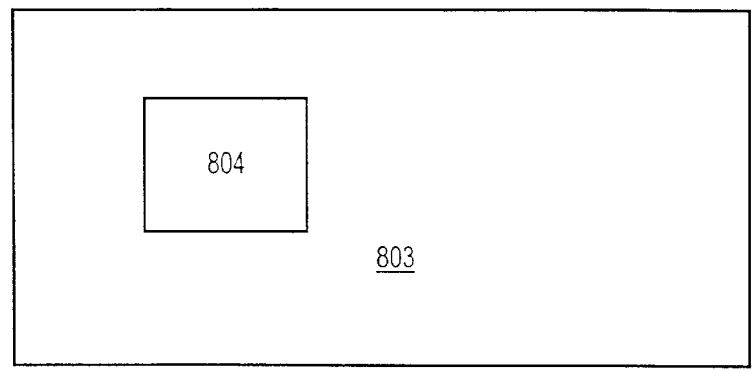
Figure 8C:
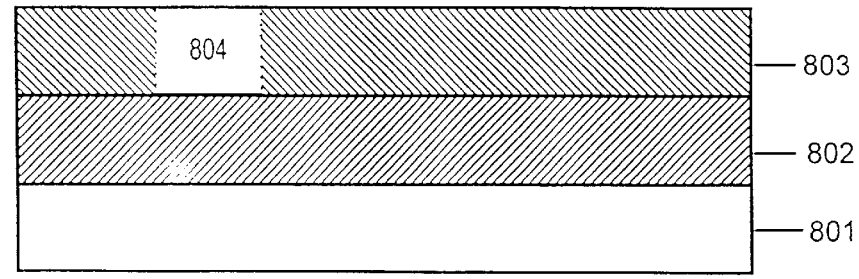
Figure 8D:
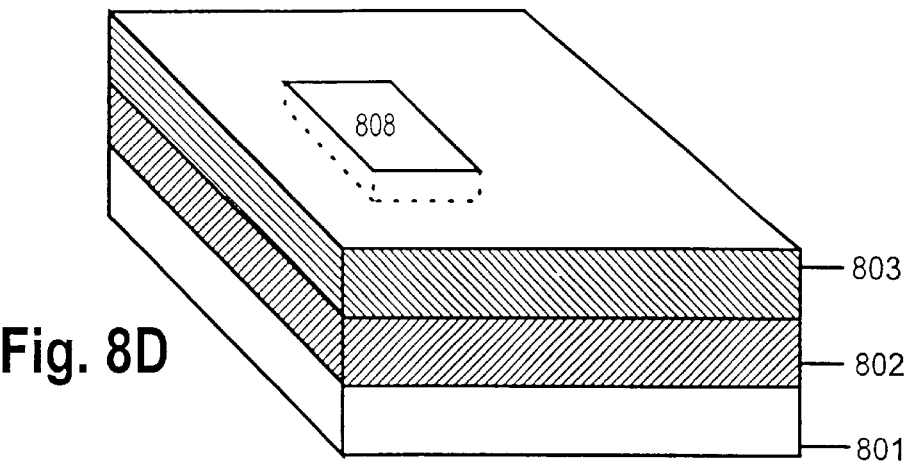

In one rib-based manufacturing process, a substrate 801 shown in side view in FIG. 8A is coated with a first layer of a cladding material 802. A second layer of a first core material 803 is deposited on this cladding layer, patterned via photolithography, and etched to produce cavities 804 illustrated in the top view of FIG. 8B. These cavities are located in areas that will eventually become the cores of the structure after processing is completed. The cavities are etched through the first core material of the second layer and to the surface of the substrate or to the surface of the cladding material of the first layer as illustrated in the side view of FIG. 8C. Etch depth is controlled by timing the etch or by using a laser interferometer.

Figure 8E:
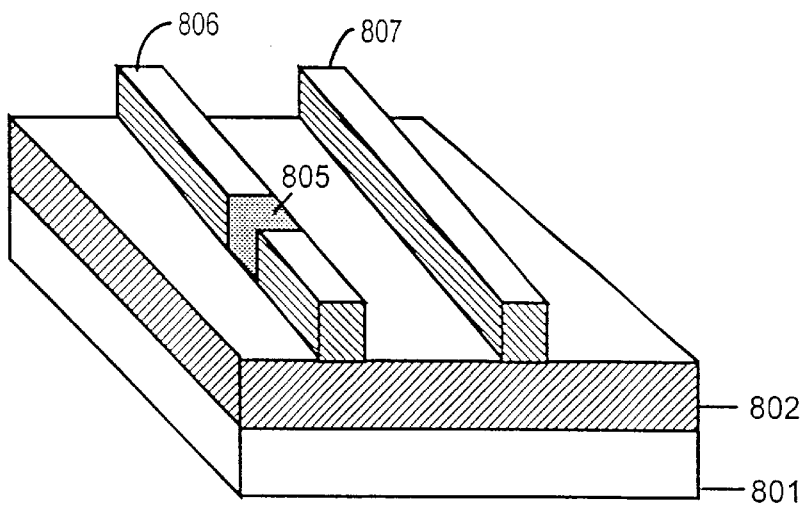
Figure 8F:
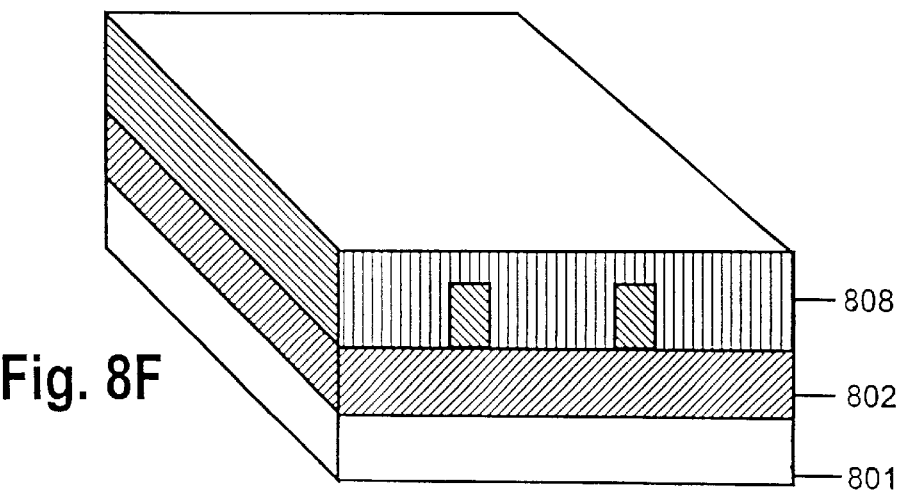

The cavities are filled with a second core material 805 and planarized via, e.g., dry etching. The structure is again patterned via photolithography and etched to the substrate or to the first cladding layer to define the ribs 806 and 807 of FIG. 8E that contain the cores. The cavities 804 so formed are usually sufficiently wide that the second core material 805 occupies the full width of the rib 806 in which the second core material is incorporated. Subsequently, the etched structure is coated with a second cladding material 808 that also fills the troughs or open spaces between the ribs as shown in FIG. 8F. The refractive index of the second cladding material 808 can be the same as or can differ from the refractive index of the first cladding material 802. Electrodes may be added to the structure where one of the materials used in forming the core buttons is an electro-optic material. Preferably, the second core material that is used to fill the core wells is electro-optic material. A temporary filler is not needed in this method.

Ribs or portions of ribs containing the second core material may be spaced sufficiently far from one another that they do not evanescently couple. In this case, the second core material induces a phase shift in the optical signal being carried in its core. Ribs or portions of ribs may be spaced sufficiently closely that the cores evanescently couple in use. The core button that is formed in one of the evanescently-coupled cores alters the optical signal in all evanescently-coupled cores a fixed amount if the second core material is a passive material, or the core button can alter the optical signal a predictable amount if the second core material is an electro-optic material.

(ii) Cladding button made by rib-based manufacturing

FIGS. 9A–F illustrate a rib-based manufacturing process for manufacturing a hybrid waveguide structure that has a cladding button. These figures also illustrate a particular embodiment in which three coplanar optical cores are formed to approach sufficiently closely that the cores evanescently couple.

Figure 9A:
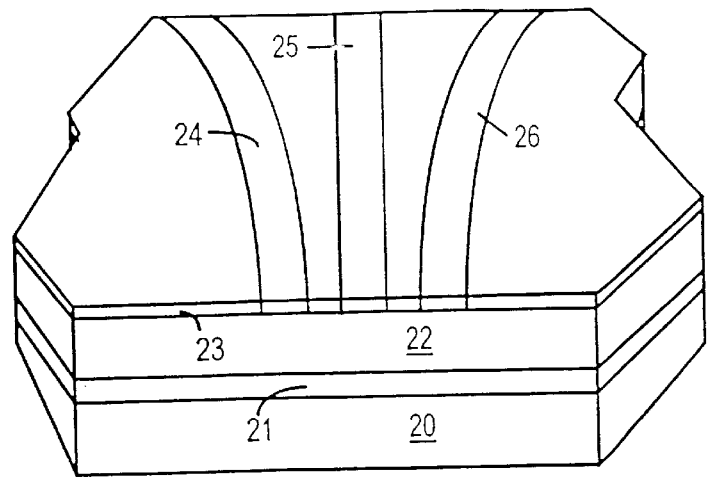
FIGS. 9A–9G illustrate a rib-based manufacturing method for manufacturing an optical waveguide or switch that has a cladding button.
Figure 9B:
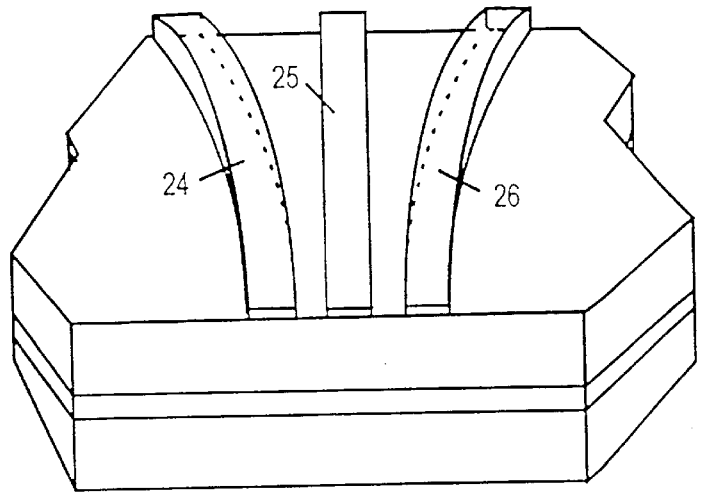
Figure 9C:
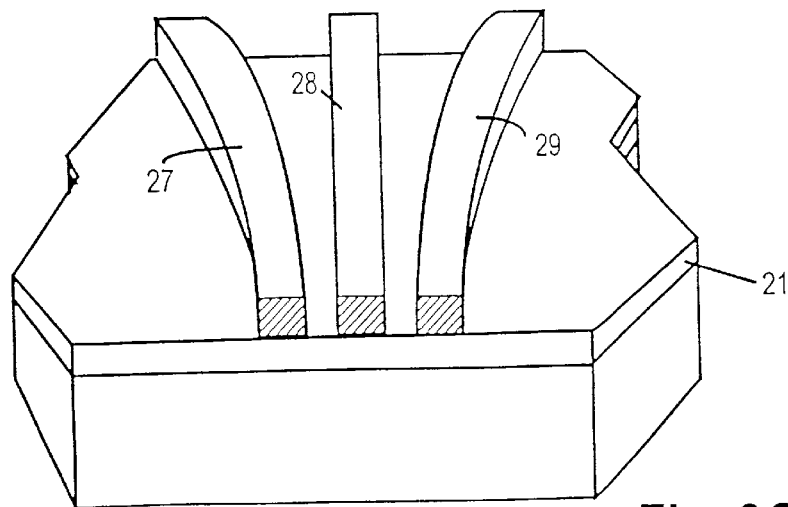

FIG. 9A illustrates a top portion of a wafer 20 on which a layer of a first cladding material 21 has been deposited. A layer of a core material 22 is deposited on cladding layer 21. A subsequently-deposited layer of photolithographic material 23 is exposed through a mask and is developed to produce a plurality of mask regions 24–26 shown in FIG. 9B. The layer of core material 22 is etched in those regions that are not protected by mask regions 24–26, thereby producing a set of cores or ribs 27–29 shown in FIG. 9C.

Figure 9D:
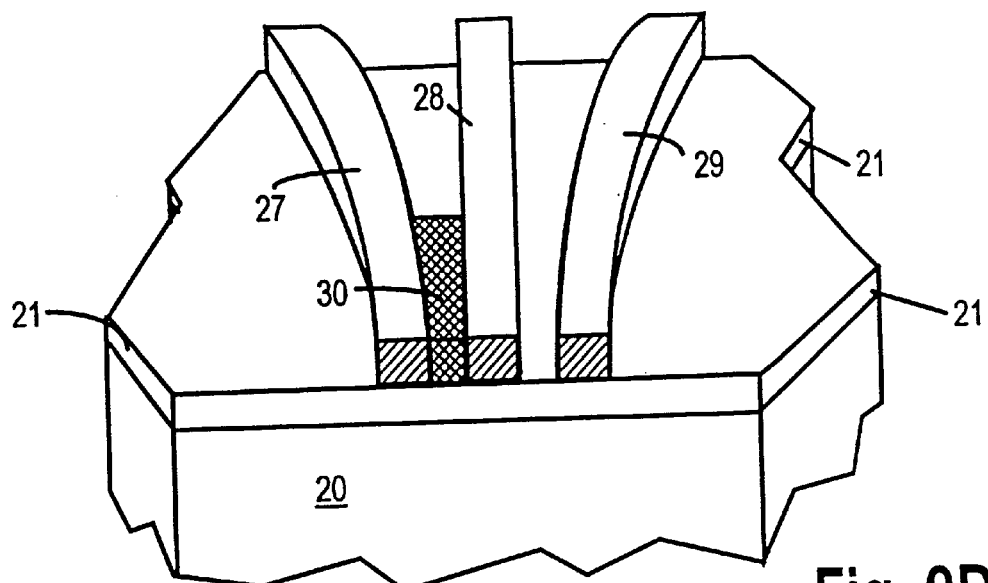
Figure 9E:
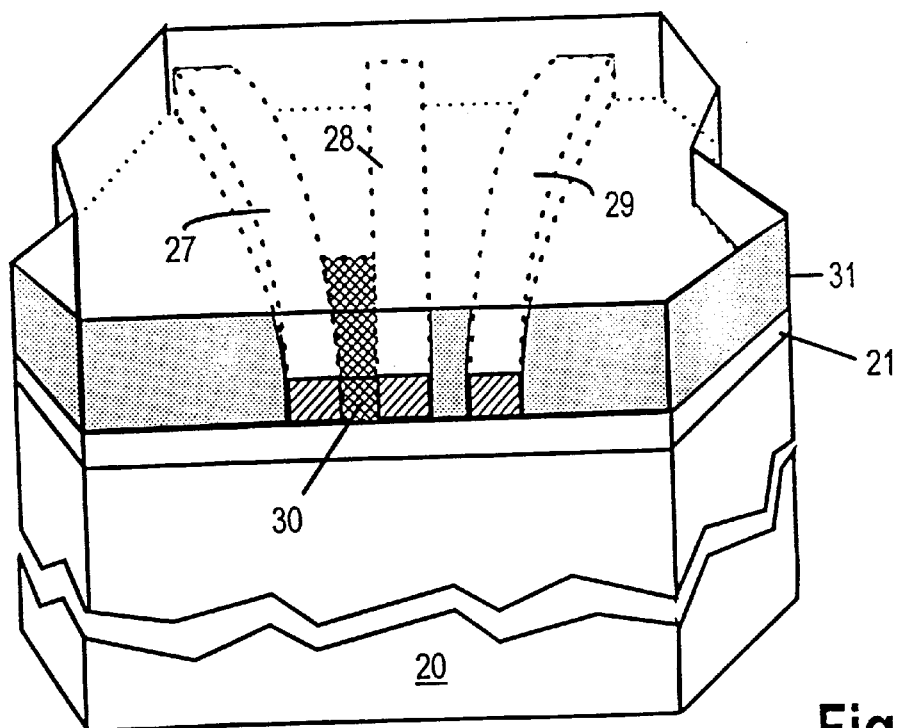

As illustrated in FIG. 9D, a layer of temporary filler (e.g., a metal that can be etched by acids that will not attack the other components of this device) is applied to fill the troughs, patterned via photolithography, and etched to leave a section of temporary filler 30 where the button is to be located in the completed hybrid waveguide structure. At this point, the structure may be completed two different ways in these preferred embodiments of the invention.

Figure 9F:
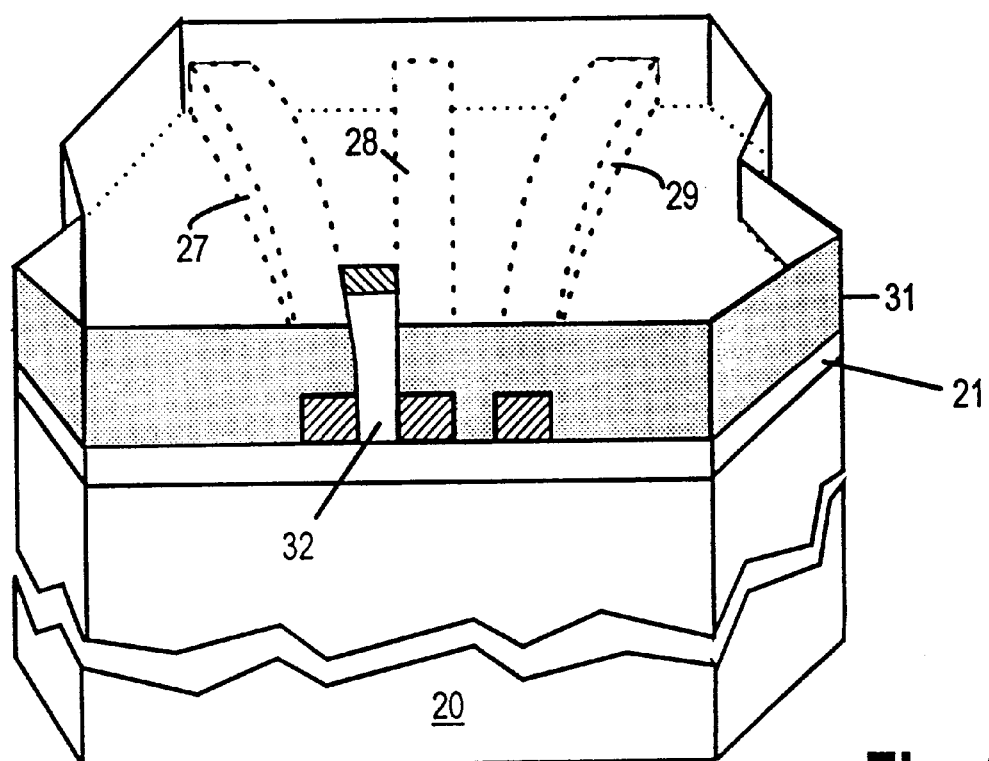
Figure 9G:
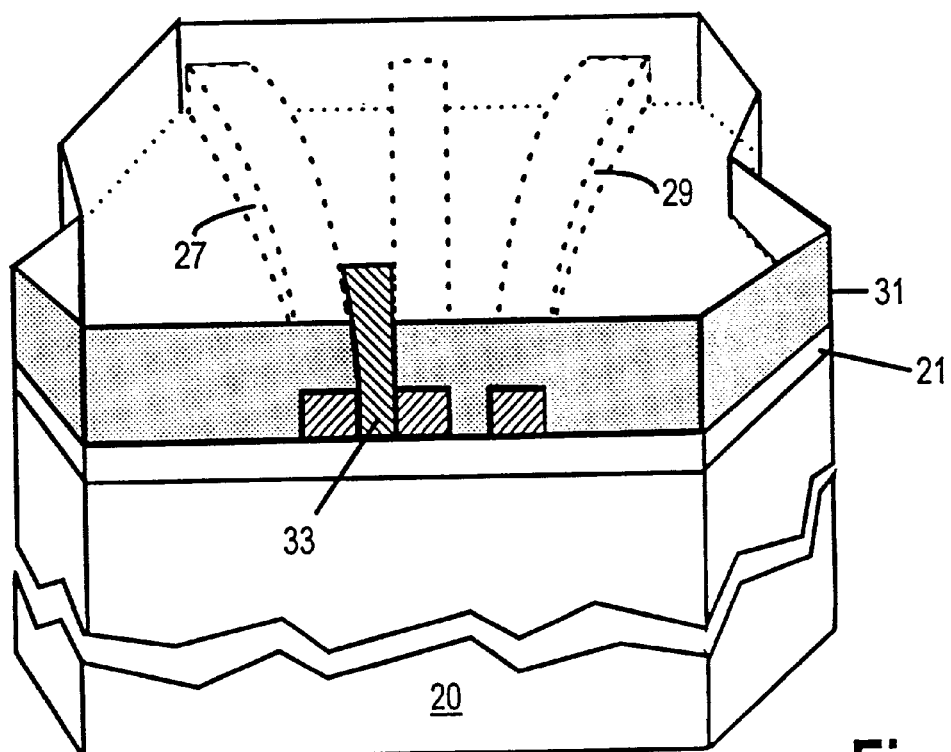

A second cladding material 31 (which preferably has the same refractive index as the first cladding material) is applied to the structure, and the second cladding material is planarized using e.g. dry etching or reactive-ion etching. The embedded sections of temporary filler are exposed by patterning and etching the structure to remove the second cladding material above the temporary filler. The temporary filler is etched to form voids 32 as shown in FIG. 9F, and a third cladding material 33 is coated onto the structure to fill the voids as shown in FIG. 9G. If the third cladding material is a passive material, usually enough of the third cladding material is placed on the structure that the third cladding material both fills the voids and forms a cladding layer over the cores. If the third cladding material is an electro-optic material, usually the layer of third cladding material is planarized using e.g. dry etching to remove the electro-optic material from all areas except the areas where the temporary filler resided. Such planarization can be accomplished by first coating the layer to be planarized with a sacrificial layer having a similar etch rate to the underlying material (such as photoresist or benzyl-cyclobutene ("benz-cyclobutene" or "cyclotene") of at least sixty percent solids), curing the layer, and etching the sacrificial layer and the underlying layer until the surface of the remaining underlying layer is substantially planar with the surface of the structure that existed prior to placing the underlying layer on it.

If the third cladding material is an electro-optic material, a fourth cladding material is spun onto the structure to form a cladding layer above the cores, and electrodes are optionally formed over the electro-optic material. A backside electrode is also optionally formed under electro-optic buttons at the beginning of the process so that, when an electrical voltage is applied to a top electrode located over an electro-optic cladding button, an electric field is produced through the electro-optic cladding button to vary the refractive index of that button.

Alternatively, instead of completing the structure as described in the previous two paragraphs, the following method may be used to complete the structure. A second cladding layer is spun onto the structure as described in the third paragraph preceding this paragraph and planarized to the tops of cores 27, 28, and 29, the temporary filler is removed, and the cavity is filled with e.g. the third cladding material described above. The structure is again planarized, and a fourth cladding layer is then spun on to complete the structure.

Electro-optic cladding buttons can be taller or shorter than or the same height as cores 27–29. The electro-optic cladding buttons may be between or may completely surround waveguides 27–29. At their point of closest approach, cores 27–29 are separated by a spacing of approximately 2–3 wavelengths or less, so that light is efficiently coupled between these cores. The electro-optic material may extend only part way between adjacent ribs, but preferably extends across the entire gap between adjacent ribs.

In this particular embodiment, the sidewalls of this button curve in a manner similar to the curved sidewalls of ribs 27 and 29. Preferably, this cladding button is wide enough that it contacts all three of these ribs 27–29, thereby providing cladding material that extends completely across the gap between each pair of adjacent ribs in the region where these ribs are most closely spaced. Instead of or additionally to placing cladding material in the curving portion of the cores, electro-optic material may be placed between the evanescently-coupled cores to effect a change in the optical signal being carried by the cores in response to an applied electric field.

(iii) Combinations of the above methods

Although much of the discussion above has been in terms of electro-optic buttons, it is generally advantageous to utilize both electro-active and passive buttons in a device incorporating hybrid waveguide structures to provide a wider range of functions on a device. For example, a passive core button can be used to provide cores with short-radius bends that act as conduits between different switches that are incorporated into a device. Interferometric switches, $\Delta\beta$ directional couplers, branching waveguide switches, total internal reflection switches, and/or multimode star or multimode interference couplers that have electro-optic core and/or cladding buttons, for instance, can also be incorporated into the same device to process the optical signal. The methods of making hybrid waveguide structures discussed above allow easy incorporation of any or all of these switches and other structures into one device because the methods permit patterning, etching, and forming the devices simultaneously.

Figure 10:
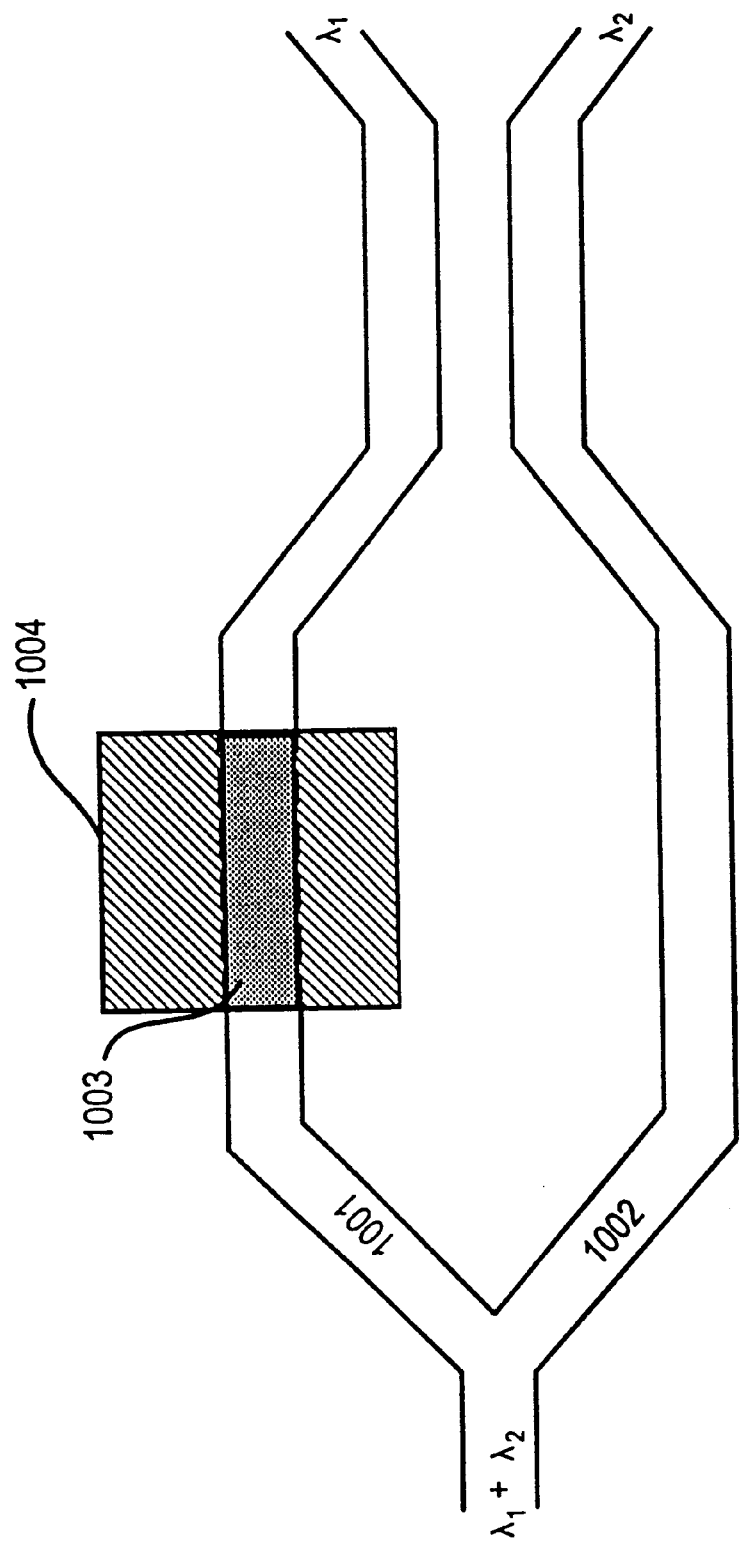
FIG. 10 shows an interferometric demodulator having both a core button and cladding buttons.

One example illustrates how the above methods can be combined to form different hybrid waveguide structures. An interferometric filter used to demultiplex optical signals is illustrated in FIG. 10. This interferometric filter is fabricated by forming both cladding buttons and a core button using passive materials.

A first passive cladding material having a refractive index of 1.5100 is spun onto a silicon substrate or a silicon substrate having an oxide layer, and a rectangular section of the cladding through which a core will eventually run is patterned via photolithography and etched to form a rectangular trench in the substrate. A second passive cladding material having a refractive index of 1.6100 is spun onto the layer of the first passive cladding material, filling the void and forming a layer on the first passive cladding material.

The second passive cladding material is planarized using e.g. photoresist and a dry etch, leaving only a rectangular section of the second passive cladding material embedded within the first passive cladding material. The structure is patterned via photolithography, and two trenches are cut into the passive cladding materials. One trench passes through the middle of the rectangular section of the second cladding material, and the other trench passes through the first cladding material. This etch has established critical features of the interferometric switch, the width, height, and spacing of the cores to a tolerance of about 0.1 micron.

Next, a temporary filler is deposited on the structure, patterned via photolithography, and etched so that temporary filler remains only within the portion of the trench passing through the rectangular section of the second cladding material. A first core material having a refractive index of 1.520 is spun onto the structure, and the layer is planarized so that the first core material remains only within the trenches. The temporary filler is etched, and the structure is coated with a second core material having a refractive index of 1.620, which is planarized so that the second core material remains only within the void in the trench left when the temporary filler was removed. A third passive cladding material that is identical to the first passive cladding material is spun onto the structure, and a rectangular section is patterned over the previously-formed rectangular section. The rectangular section of the third passive cladding material is etched to the second core material to form a rectangular trench, and subsequently a fourth passive cladding material that is identical to the second passive cladding material is spun onto the structure to complete it. The resulting hybrid waveguide structure has two cores 1001 and 1002 embedded in cladding material, and the structure has a core button 1003 and cladding button 1004.

An optical signal consisting of two different wavelengths of light enters the filter through an input core, splits into twin signals at a junction, and each signal passes through a core. One of the cores 1001 has hybrid core and cladding buttons, wherein the phase of the signal in that core is shifted when its phase is compared to the phase of its former twin signal passing through the other core. The cores subsequently approach each other and are sufficiently close together that evanescent coupling occurs between the cores. As the cores diverge again, one core carries light of wavelength $\lambda_1$, and the other core carries light of wavelength $\lambda_2$. These signals can be used in other switches located down-stream of the interferometric filter just described.

This example illustrates various advantages of this invention. Critical dimensions of cores can be established in one photolithography step, which establishes those dimensions to an accuracy of about 0.1 micron using current processing equipment. Less critical dimensions are established in steps that have less accuracy. For example, a mask aligner can reposition a substrate to an accuracy of only about ±1.0 micron. Formation of cladding areas (which can be sized to be slightly over-size or under-size without affecting the performance of the switch) is established in separate photolithography steps. Thus, using certain methods of this invention establishes critical dimensions of features to high accuracy. Many combinations of materials may also be incorporated into the cores, the cladding, or both.

Descriptions of specific designs and dimensions are provided only as examples. It is to be understood that various modifications to the preferred embodiments will be readily apparent to those skilled in the art. Thus, while preferred embodiments of the invention have been disclosed, it will be readily apparent to those skilled in the art that the invention is not limited to the disclosed embodiments but, on the contrary, is intended to cover numerous other modifications and broad equivalent arrangements that are included within the spirit and scope of the following claims.

What is claimed is:

1. A trench-based method of making a hybrid waveguide structure having hybrid cladding, said method comprising (a) providing a layer of cladding material, wherein the layer of cladding material comprises a region of a first polymeric cladding material embedded within a layer of a second polymeric cladding material, and (b) forming a polymeric core having a length within the layer of cladding material, wherein at least one side of the polymeric core abuts a portion of the first polymeric cladding material at a first position along the length of the core and wherein said side of the core abuts a portion of the second polymeric cladding material at a second position along the length of the polymeric core.

2. The trench-based method of claim 1, wherein the act of providing a layer of cladding material comprises (a) patterning a layer of the second polymeric cladding material to form a contact mask on the layer of the second polymeric cladding material;

(b) etching portions of the layer of the second polymeric cladding material that are unprotected by the contact mask to form cavities; and (c) filling the cavities with the first polymeric cladding material.

3. The trench-based method of claim 1, wherein the act of providing a layer of cladding material comprises (a) patterning a layer of the second polymeric cladding material to form a contact mask on the layer of the second polymeric cladding material;

(b) etching portions of the layer of the second polymeric cladding material that are unprotected by the contact mask to form cavities;

(c) filling the cavities with the first polymeric cladding material; and (d) planarizing the layer of the first polymeric cladding material so that the first polymeric cladding material has a surface that is coplanar with a surface of the second polymeric cladding material.

4. The trench-based method of claim 1, wherein the act of forming a polymeric core having a length within the layer of cladding material comprises:

(a) patterning the layer of cladding material to form a contact mask on the layer of cladding material, wherein the contact mask provides a region on the layer of cladding material that is unprotected by the mask, said region being located over the first polymeric cladding material and the second polymeric cladding material;

(b) etching the region to form a contiguous trench through the first polymeric cladding material and the second polymeric cladding material; and (c) filling the trench with a polymeric core material.

5. The trench-based method of claim 4, wherein the act of filling the trench with a polymeric core material comprises filling the trench with a first polymeric core material and a second polymeric core material, wherein the first polymeric core material abuts the first polymeric cladding material and the second polymeric core material abuts the second polymeric cladding material.

6. The trench-based method of claim 5, wherein the difference between the refractive indices of the first polymeric core material and the first polymeric cladding material is at least approximately equal to the difference between the refractive indices of the second polymeric core material and the second polymeric cladding material.

7. The trench-based method of claim 5, wherein the first polymeric cladding material is an electro-optic material.

8. The trench-based method of claim 5, wherein the first polymeric cladding material is an active material.

9. The trench-based method of claim 4, wherein the act of filling the trench with a core material comprises:

(a) filling the trench with a temporary filler and a second polymeric core material, wherein the temporary filler abuts the first polymeric cladding material and the second polymeric core material abuts the second polymeric cladding material;

(b) removing the temporary filler to create voids, and (c) filling the voids with a first polymeric core material.

10. The trench-based method of claim 4, wherein the act of filling the trench with a core material comprises:

(a) filling the trench with a first polymeric core material and a temporary filler, wherein the first polymeric core material abuts the first polymeric cladding material and the temporary filler abuts the second polymeric cladding material;

(b) removing the temporary filler to create voids; and (c) filling the voids with a second polymeric core material.

11. The trench-based method of claim 1, wherein the act of forming a polymeric core having a length within the layer of cladding material comprises:

(a) patterning the layer of cladding material to form a contact mask on the layer of cladding material, wherein the contact mask provides a region on the layer of cladding material that is unprotected by the mask, said region being located over the first polymeric cladding material and the second polymeric cladding material;

(b) etching the region to form a contiguous trench through the first polymeric cladding material and the second polymeric cladding material;

(c) placing a layer of a polymeric core material over the layer of cladding material, thereby filling the trench with the polymeric core material; and (d) planarizing the layer of the polymeric core material so that the polymeric core material is coplanar with the surface of the layer of cladding material.

12. A rib-based method for making a hybrid waveguide structure having a hybrid core, said method comprising:

(a) providing a layer of a first core material;

(b) removing a portion of the first core material to form a cavity;

(c) filling the cavity with a second core material; and (d) removing a sufficient amount of the first core material to form a core having a length, a width, and a depth such that the core has a portion along its length wherein the second core material spans the width and depth of the core, and the second core material is located between two portions of the first core material of the core.

13. The rib-based method of claim 12, wherein the act of removing the portion of the first core material to form the cavity comprises (1) patterning the layer of the first core material to form a contact mask on the layer; and (2) etching portions of the layer of the first core material that are unprotected by the contact mask to form the cavity;

the act of filling the cavity with the second core material comprises filling the cavity with the second core material to form a layer of first and second core materials;

and the act of removing the sufficient amount of the first core material to form the core comprises (1) patterning the layer of the first and second core materials to form a second contact mask on the layer, wherein the second contact mask provides a region on the layer that is unprotected by the mask, said region being located over the first core material and the second core material; and (2) etching the region to form a rib having an optical path, wherein the rib is comprised of the first core material and the second core material, and wherein the first core material abuts the second core material at a position along the optical path of the rib.

14. The rib-based method of claim 13, wherein the method further comprises the act of planarizing the layer of the first and second core materials so that the first core material and the second core material have a coplanar surface, and wherein said act is performed after the act of filling the cavity with the second core material and before the act of patterning the layer of the first and second core materials.

15. The rib-based method of claim 12, wherein the second core material is an electro-optic material.

16. The rib-based method of claim 12, wherein the second core material is an active material.

17. A rib-based method of making a hybrid waveguide structure having hybrid cladding, said method comprising:

(a) providing a layer of a first cladding material comprising a first polymer;

(b) forming a core comprising a core material on the first cladding material such that the first cladding material abuts a side of the core at a first position along the length of the core and wherein said core material comprises a second polymer; and (c) placing a second cladding material comprising a third polymer adjacent to said side of the core such that the second cladding material abuts said side of the core at a second position along the length of the core.

18. The rib-based method of claim 17, wherein the act of forming the core comprised of the core material on the first cladding material comprises (1) providing a layer of a first cladding material;

(2) placing a layer of a core material on the layer of the first cladding material; and (3) placing a mask on the layer of the core material;

and the act of placing a second cladding material adjacent to said side of the core comprises (1) etching the layer of core material in those regions that are not protected by the mask to produce a rib of the core material on the layer of the first cladding material;

(2) placing a layer of a temporary filler on the layer of the first cladding material;

(3) placing a mask on the layer of the temporary filler;

(4) etching the layer of the temporary filler to the surface of the layer of first cladding material in those regions of the layer of temporary filler that are not protected by the mask, thereby producing a section of temporary filler;

(5) placing a layer of a second cladding material onto the layer of first cladding material;

(6) removing the section of temporary filler to form a cavity; and (7) filling the cavity with a third cladding material to form a layer comprised of the first cladding material, the core material, the second cladding material, and the third cladding material.

19. The rib-based method of claim 18, wherein the method further comprises, after the act of filling the cavity with the third cladding material to form the layer comprised of the first cladding material, the core material, the second cladding material, and the third cladding material, the acts of:

(a) planarizing the layer comprised of the first cladding material, the core material, the second cladding material, and the third cladding material so that each of the core material, the second cladding material, and the third cladding material have a coplanar surface; and (b) placing a fourth cladding material onto the layer comprised of the first cladding material, the core material, the second cladding material, and the third cladding material.

20. The rib-based method of claim 19, wherein the refractive index of the first cladding material is less than the refractive index of the second cladding material, and the refractive index of the first cladding material is less than the refractive index of the third cladding material.

21. A rib-based method for manufacturing a device useful in an optical circuit, said method comprising:

(a) forming a structure having at least one rib, which rib comprises a first core material comprising a first polymer;

(b) placing an optical material adjacent to said at least one rib, wherein the optical material comprises a cladding material comprising a second polymer; and (c) forming at least one polymeric hybrid region on the structure, wherein the hybrid region comprises at least one member selected from the group consisting of:

(i) a hybrid core region, in which the rib comprises a first portion, a second portion, and a third portion, respectively, along the length of the rib, wherein the first portion and the third portion each comprises the first polymer, wherein the second portion consists essentially of a second core material, wherein the depth of the first, second, and third portions is at least essentially identical, and wherein the hybrid core region is the second portion; and (ii) a hybrid cladding region, wherein a portion of the cladding adjacent to the rib comprises a second cladding material.

22. The rib-based method of claim 21, wherein the act of forming a structure having at least one rib comprises:

(a) forming a layer of the first core material on top of the layer of the first cladding material;

(b) forming a photoresist layer on top of the layer of first core material;

(c) patterning the photoresist layer;

(d) developing the photoresist layer to form a contact mask;

(e) etching the layer of first core material that is unprotected by the contact mask to produce the rib; and (f) removing the contact mask.

23. The rib-based method of claim 21, wherein the act of forming at least one hybrid region on the structure comprises placing a temporary filler in the core material or in the cladding material and subsequently replacing the temporary filler with a second core material or second cladding material, respectively.

24. The rib-based method of claim 21, wherein the act of forming the structure having at least one rib comprises (1) forming a first layer of a first cladding material;

(2) forming a second layer of a core material on top of the first layer of the first cladding material; and (3) forming at least one rib in the first layer, which rib comprises the core material of the first layer;

the act of placing the optical material onto the structure and adjacent to said at least one rib comprises (1) placing a temporary filler next to a portion of the rib; and (2) placing a third layer of a cladding material over the rib such that this cladding material is adjacent to the sides of the rib and is on top of the rib;

and the act of forming at least one hybrid region on the structure comprises (1) removing the temporary filler to create voids; and (2) filling the voids with a cladding material having a refractive index that differs from the refractive index of the third layer.

25. The rib-based method of claim 24, wherein the act of placing a temporary filler next to a portion of the rib comprises:

(a) depositing a sufficient amount of the temporary filler over the first and second layers that a substantially planar surface is formed when the temporary filler is planarized; and (b) removing a portion of the temporary filler.

26. The rib-based method of claim 24 wherein the cladding material of the third layer has a refractive index that differs from the refractive index of the first cladding material.

27. The rib-based method of claim 21, wherein said hybrid region is formed of an active material.

28. The rib-based method of claim 27, wherein the active material is an electro-optic material and wherein the method further comprises (a) forming an electrode above each hybrid region formed of the electro-optic material; and (b) forming a backplane conductor, whereby an electric field can be applied across each hybrid region to control the refractive index of each hybrid region.

29. A method for making a hybrid waveguide structure made of a first optical material, said method comprising:

(a) placing a temporary filler in the first optical material;

(b) removing a portion of the temporary filler to leave first voids;

(c) filling the first voids with a second optical material;

(d) removing remaining temporary filler to form second voids; and (e) filling the second voids with a third optical material.

30. The method of claim 29 wherein the act of placing a temporary filler in the first optical material comprises (1) removing a portion of said first optical material to form cavities in the first optical material; and (2) filling the cavities with a temporary filler;

the act of removing the portion of the temporary filler to leave the first voids comprises (1) masking a portion of the temporary filler; and (2) removing unmasked temporary filler to leave first voids;

the act of removing remaining temporary filler to form second voids comprises (1) masking a portion of the remaining temporary filler; and (2) removing the unmasked portion of the remaining temporary filler to form second voids;

and the method further comprises (1) removing the remaining temporary filler to form third voids; and (2) filling the third voids with a fourth optical material.

31. A method of making a hybrid digital electro-optic switch, said method comprising:

(a) providing a base;

(b) forming at least three coupled cores on said base; and (c) providing cladding elements between the coupled cores;

(d) wherein at least two of the coupled cores or at least two of the cladding elements between the coupled cores are each separately formed of a first material and a second material, wherein the first material has a refractive index that differs from the second material, and said second material has less of a change in its refractive index in the presence of an electric field than said first material; and (e) wherein the other of the coupled cores or the cladding elements are formed of a third material that has a refractive index that differs from the refractive index of the first and the second materials.

32. A trench-based of making a hybrid waveguide structure having a hybrid core, said method comprising (a) forming a trench in a layer of a cladding material;

(b) filling a portion of the trench with a temporary filler to form trench portions filled with the temporary filler and unfilled trench portions;

(c) filling the unfilled trench portions with a second core material;

(d) removing the temporary filler from the trench portions filled with the temporary filler to form voids; and (e) filling the voids with a first core material.

33. The trench-based method of claim 32 wherein the cladding material is a polymeric cladding material, wherein the first core material comprises a first polymeric core material, and wherein the second core material comprises a second polymeric core material.

34. The trench-based method of claim 33 wherein the second core material is an active material and the first core material and the cladding material are passive materials.

35. The trench-based method of claim 33 wherein the second core material is an electro-optic material and the first core material and the cladding material are passive materials.

36. The trench-based method of claim 32 wherein act (a) comprises:

(a) filling the trench so formed with the temporary filler; and (b) removing a portion of the temporary filler to form said trench portions filled with the temporary filler and unfilled trench portions.

37. The trench-based method of claim 32 wherein act (a) comprises:

(a) filling the trench so formed with the temporary filler;

(b) masking a portion of the temporary filler to form masked temporary filler and unmasked temporary filler; and (c) etching the unmasked temporary filler to form said trench portions filled with the temporary filler and said unfilled trench portions.

38. The trench-based method of claim 32 further comprising the act of planarizing the second core material prior to filling the voids with the first core material.

39. The trench-based method of claim 32 further comprising the act of planarizing the first core material.

40. The trench-based method of claim 32 wherein the first core material is selected from the group consisting of electro-optic material and passive material.

41. The trench-based method of claim 32 wherein the cladding material is a passive cladding material, the first core material is a first passive core material, and the second core material is selected from the group consisting of electro-optic material and a second passive material.

42. The trench-based method of claim 32 wherein the first core material is an active material.

43. The trench-based method of claim 32 wherein the cladding material is a passive cladding material, the first core material is a first passive core material, and the second core material is selected from the group consisting of active material and a second passive material.

44. A trench-based method of making a hybrid waveguide structure having hybrid cladding, said method comprising
   (a) providing a layer of cladding material, wherein the layer of cladding material comprises a region of a first cladding material embedded within a layer of a second cladding material, and
   (b) forming a core having a length within the layer of cladding material, wherein at least one side of the core abuts a portion of the first cladding material at a first position along the length of the core and wherein said side of the core abuts a portion of the second cladding material at a second position along the length of the core, and wherein the core is formed by
      (i) patterning the layer of cladding material to form a contact mask on the layer of cladding material, wherein the contact mask provides a region on the layer of cladding material that is unprotected by the mask, said region being located over the first cladding material and the second cladding material;
      (ii) etching the region to form a contiguous trench through the first cladding material and the second cladding material; and
      (iii) filling the trench with a first core material and a second core material, wherein the first core material abuts the first cladding material and the second core material abuts the second cladding material.

45. The trench-based method of claim 44, wherein the difference between the refractive indices of the first core material and the first cladding material is at least approximately equal to the difference between the refractive indices of the second core material and the second cladding material.

46. The trench-based method of claim 44, wherein the first cladding material is an electro-optic material.

47. The trench-based method of claim 44, wherein the act of filling the trench with the core material comprises:
   (a) filling the trench with a temporary filler and the second core material, wherein the temporary filler abuts the first cladding material and the second core material abuts the second cladding material;
   (b) removing the temporary filler to create voids, and
   (c) filling the voids with the first core material.

48. The trench-based method of claim 44, wherein the act of filling the trench with a core material comprises:
   (a) filling the trench with a first core material and a temporary filler, wherein the first core material abuts the first cladding material and the temporary filler abuts the second cladding material;
   (b) removing the temporary filler to create voids; and
   (c) filling the voids with a second core material.

49. A trench-based method of making a hybrid waveguide structure having a hybrid core, said method comprising:
   (a) forming a trench in a layer of a cladding material;
   (b) filling a portion of the trench with a temporary filler to form trench portions filled with the temporary filler and unfilled trench portions;
   (c) filling the unfilled trench portions with a second core material;
   (d) removing the temporary filler from the trench portions filled with the temporary filler to form voids; and
   (e) filling the voids with a first core material.

50. The trench-based method of claim 49 wherein the second core material is an electro-optic material and the first core material and the cladding material are passive materials.

51. The trench-based method of claim 49 wherein act (a) comprises:
   (a) filling the trench so formed with the temporary filler; and
   (b) removing a portion of the temporary filler to form said trench portions filled with the temporary filler and unfilled trench portions.

52. The trench-based method of claim 49 wherein act (a) comprises:
   (a) filling the trench so formed with the temporary filler;
   (b) masking a portion of the temporary filler to form masked temporary filler and unmasked temporary filler; and
   (c) removing the unmasked temporary filler to form said trench portions filled with the temporary filler and unfilled trench portions.

53. The trench-based method of claim 49 further comprising the act of planarizing the second core material prior to filling the voids with the first core material.

54. The trench-based method of claim 49 further comprising the act of planarizing the first core material.

55. The trench-based method of claim 49 wherein the first core material is selected from the group consisting of electro-optic material and passive material.

56. The trench-based method of claim 49 wherein the cladding material is a passive cladding material, the first core material is a passive core material, and the second core material is selected from the group consisting of electro-optic material and passive material.

57. A rib-based method of making a hybrid waveguide structure having hybrid cladding, said method comprising:
   (a) providing a layer of a first cladding material;
   (b) placing a layer of a core material on the layer of the first cladding material;
   (c) placing a mask on the layer of the core material;
   (d) etching the layer of core material in those regions that are not protected by the mask to produce a rib of the core material on the layer of the first cladding material;
   (e) placing a layer of a temporary filler on the layer of the first cladding material;
   (f) placing a mask on the layer of the temporary filler;
   (g) etching the layer of the temporary filler to the surface of the layer of first cladding material in those regions of the layer of temporary filler that are not protected by the mask, thereby producing a section of temporary filer;
   (h) placing a layer of a second cladding material onto the layer of first cladding material;
   (i) removing the section of temporary filler to form a cavity; and
   (j) filling the cavity with a third cladding material to form a layer comprised of the first cladding material, the core material, the second cladding material, and the third cladding material.

58. The rib-based method of claim 57, wherein the method further comprises, after the act of filling the cavity with a third cladding material to form a layer comprised of the first cladding material, the core material, the second cladding material, and the third cladding material, the acts of:

(a) planarizing the layer comprised of the first cladding material, the core material, the second cladding material, and the third cladding-material so that each of the core material, the second cladding material, and the third cladding material have a coplanar surface; and (b) placing a fourth cladding material onto the layer comprised of the first cladding material, the core material the second cladding material, and the third cladding material.

59. The rib-based method of claim 58, wherein the refractive index of the first cladding material is less than the refractive index of the second cladding material, and the refractive index of the first cladding material is less than the refractive index of the third cladding material.

60. A rib-based method for manufacturing optical circuits, said method comprising:

(a) forming a structure having at least one rib, which rib comprises a core material;

(b) placing an optical material adjacent to said at least one rib, wherein the optical material comprises a cladding material; and (c) placing a temporary filler in the core material or in the cladding material and subsequently replacing the temporary filler with a second core material or second cladding material, respectively.

61. The rib-based method of claim 60, wherein the act of forming the structure having at least one rib comprises:

(a) forming a first layer of a first cladding material;

(b) forming a second layer of a core material on top of the first layer of the first cladding material; and (c) forming at least one rib in the first and second layers, which rib comprises a portion of the core material of the first layer and a portion of the first cladding material of the second layer, and the acts of placing the optical material adjacent to said at least one rib, wherein the optical material comprises a cladding material; and placing the temporary filler in the core material or in the cladding material and subsequently replacing the temporary filler with a second core material or second cladding material, respectively, comprise the acts of (d) placing a temporary filler next to a portion of the rib;

(e) placing a second cladding material over the rib such that the second cladding material is adjacent to the sides of the rib and the second cladding material is on top of the rib;

(f) removing the temporary filler to create voids; and (g) filling the voids with a third cladding material having a refractive index that differs from the refractive index of the second cladding material.

62. The rib-based method of claim 61, wherein the act of placing the temporary filler next to a portion of the rib comprises:

(a) depositing a sufficient amount of the temporary filler over the first and second layers that a substantially planar surface is formed when the temporary filler is planarized; and (b) removing a portion of the temporary filler.

\* \* \* \* \*